United States Patent
Niie et al.

(10) Patent No.: US 6,640,007 B1
(45) Date of Patent: Oct. 28, 2003

(54) ELECTRONIC WRITING IMPLEMENT AND METHOD OF ELECTRONIC WRITING

(75) Inventors: Manabu Niie, Sagamihara (JP); Makoto Shioya, Tokyo (JP); Tatsuo Furukawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/454,593

(22) Filed: Dec. 7, 1999

(30) Foreign Application Priority Data

Dec. 7, 1998 (JP) .......................................... 10-346457
Oct. 22, 1999 (JP) .......................................... 11-300557

(51) Int. Cl.7 ................................................ G06K 9/00
(52) U.S. Cl. ..................... 382/188; 340/5.61; 340/5.64; 345/157; 345/179; 345/180; 345/182; 345/183; 382/119; 382/189; 382/314; 382/315
(58) Field of Search .............................. 382/135–138, 382/119, 181, 187–189, 312–317; 713/176, 183, 200; 345/157–158, 179–184; 340/5.61, 5.64

(56) References Cited

U.S. PATENT DOCUMENTS

| | | | | |
|---|---|---|---|---|
| 5,191,613 A | * | 3/1993 | Graziano et al. ........... | 713/176 |
| 5,948,103 A | * | 9/1999 | Fukuzaki .................... | 713/200 |
| 6,195,446 B1 | * | 2/2001 | Skoog ........................ | 382/119 |
| 6,307,955 B1 | * | 10/2001 | Zank et al. ................. | 382/121 |
| 6,401,206 B1 | * | 6/2002 | Khan et al. ................. | 713/176 |
| 6,510,521 B1 | * | 1/2003 | Albrecht ..................... | 713/93 |

FOREIGN PATENT DOCUMENTS

| | | |
|---|---|---|
| JP | 589220 | 4/1993 |
| JP | 6247022 | 9/1994 |
| JP | 6328827 | 11/1994 |

* cited by examiner

*Primary Examiner*—Timothy M. Johnson
*Assistant Examiner*—Gregory Desire
(74) *Attorney, Agent, or Firm*—Antonelli, Terry, Stout & Kraus, LLP

(57) ABSTRACT

An electronic seal stamp and an electronic sheet are used. The electronic seal stamp has a stamp surface, and has a storing function and output function for electronic information. The electronic sheet is of a sheet shape, has a surface capable of being impressed, and has a storing function and input function for electronic information. When the electronic seal stamp is impressed on the electronic sheet, a seal image on the stamp surface of the electronic seal stamp is transferred to the surface of the electronic sheet. At the same time, the electronic information stored in the storing function of the electronic seal stamp is transferred to the storing function of the electronic sheet, through the output function of the electronic seal stamp and the input function of the electronic sheet. Thus, an electronic seal stamp system, in which both impression of the stamp surface and electronic sealing are possible, is realized.

46 Claims, 30 Drawing Sheets

VIEW SEEN FROM BELOW (STAMP SURFACE)   VIEW SEEN FROM ABOVE

| 210 | |
|---|---|
| SEAL STAMP IDENTIFICATION INFORMATION | 41421356 |
| SEAL IMAGE INFORMATION | (SEAL IMAGE DATA) |
| PERIOD OF VALIDITY | 1998/12/31, 12:00 |

| FULL NAME | YAMAMOTO, Taro |
|---|---|
| NAME NUMBER | 2234567 |
| ADDRESS | XXXX, YOKOHAMA, KANAGAWA, JAPAN |
| TELEPHONE NUMBER | 045-XXX-XXXX |
| E-mail ADDRESS | Yamamoto@mail.XX.jp |

INFORMATION OF SEAL STAMP REGISTRATION

230

| 210 SEAL STAMP INFORMATION | SEAL STAMP IDENTIFICATION INFORMATION | 41421356 |
|---|---|---|
| | SEAL IMAGE INFORMATION | (SEAL IMAGE DATA) |
| | PERIOD OF VALIDITY | 1998/12/31, 12:00 |
| 220 SEAL STAMP OWNER INFORMATION | FULL NAME | YAMAMOTO, Taro |
| | NAME NUMBER | 2234567 |
| | ADDRESS | XXXX, YOKOHAMA, KANAGAWA, JAPAN |
| | TELEPHONE NUMBER | 045-XXX-XXXX |
| | E-mail ADDRESS | Yamamoto@mail.XX.jp |

FIG. 7

INFORMATION OF SEAL STAMP REGISTRATION

240

| 210 SEAL STAMP INFORMATION | SEAL STAMP IDENTIFICATION INFORMATION | 41421356 |
|---|---|---|
| | SEAL IMAGE INFORMATION | I-41421356 |
| | PERIOD OF VALIDITY | 1998/12/31, 12:00 |
| 220 SEAL STAMP OWNER INFORMATION | FULL NAME | YAMAMOTO, Taro |
| | NAME NUMBER | 2234567 |
| | ADDRESS | XXXX, YOKOHAMA, KANAGAWA, JAPAN |
| | TELEPHONE NUMBER | 045-XXX-XXXX |
| | E-mail ADDRESS | Yamamoto@mail.XX.jp |

POINTING

241

| 1-41421356 | (SEAL IMAGE DATA) |
|---|---|

FIG. 18

| 251 SEALING INFORMATION | 252 SEALING COLUMN INFORMATION | | STAMP FOR XX RECEIPT |
|---|---|---|---|
| | SEAL STAMP INFORMATION 253 | SEAL STAMP IDENTIFICATION INFORMATION | 41421356 |
| | | SEAL IMAGE INFORMATION | (SEAL IMAGE DATA) |
| | | PERIOD OF VALIDITY | 1998/12/31, 12:00 |
| | SEAL STAMP OWNER INFORMATION 254 | FULL NAME | YAMAMOTO, Taro |
| | | NAME NUMBER | 2234567 |
| | | ADDRESS | XXXX, YOKOHAMA, KANAGAWA, JAPAN |
| | | TELEPHONE NUMBER | 045-XXX-XXXX |
| | | E-mail ADDRESS | Yamamoto@mail.XX.jp |

MICROSWITCH VERSION

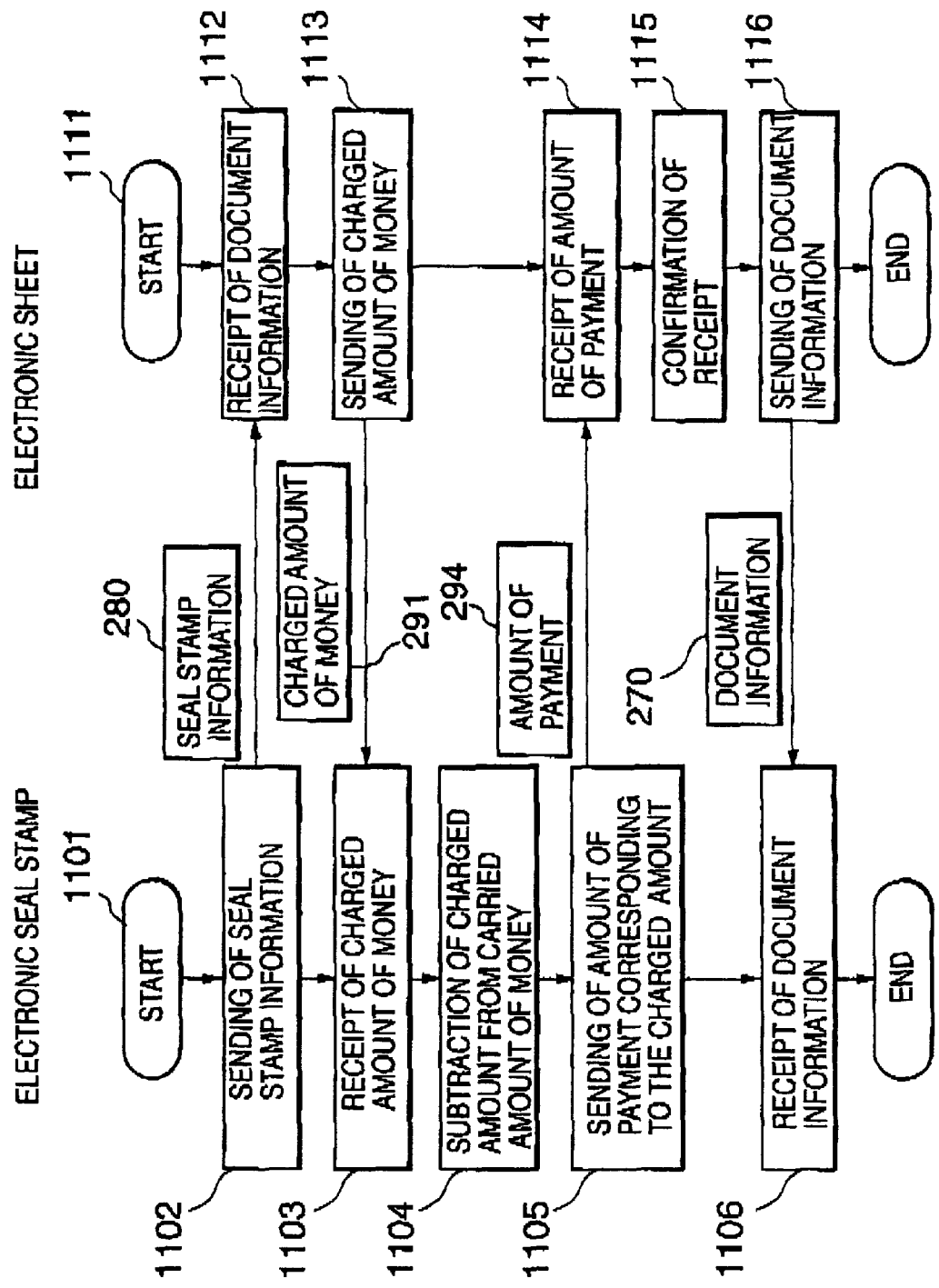

ELECTRONIC WRITING IMPLEMENT AND METHOD OF ELECTRONIC WRITING

BACKGROUND OF THE INVENTION

1. Field of the Invention

The present invention relates to writing implements for entering or transferring characters, symbols, illustrations or marks into a medium such as paper, and in particular among them, relates to a seal stamp that can impress or transfer a seal image of the stamp surface, and a pen that can write characters or symbols according to movements of a user's hand. The term "pen" includes, for example, a ballpoint pen, a fountain pen, a pencil, and the like, and any implement that can write characters or symbols according to movements of a user's hand is included.

2. Related Art Statement (1) Usually, a conventional seal stamp using an inkpad and without an electronic function and ordinary paper without an electronic function are used, and the signature function of the seal stamp is realized when the stamp surface of the seal stamp is impressed and transferred onto the paper.

(2) Japanese Unexamined Patent Application Laid-open No. 5-89220, "Electronic seal system (ELECTRONIC IMPRINTER)"

This document discloses a system that catches an identification signal emitted from an electronic seal stamp, transforms the identification signal into identification data, reads seal image data corresponding to the identification data from an image data storing file, and sends the seal image data to an electronic information editorial-control apparatus. An object of this system is to seal electronic information.

(3) Japanese Unexamined Patent Application Laid-open No. 6-247022, "Electronic seal stamp and electronic seal stamp system (ELECTRONIC SEAL AND ELECTRONIC SEALING SYSTEM)"

Similarly to the above document (2), an object of this is to seal electronic information.

(4) Japanese Unexamined Patent Application Laid-open No. 6-328827, "Electronic seal stamp and terminal apparatus (ELECTRONIC SEAL AND TERMINAL EQUIPMENT)"

Compared with the above documents (2) and (3), this is different in that an electronic seal stamp itself has seal image data.

SUMMARY OF THE INVENTION

The above-described conventional technique (1) only transfers the seal image of the stamp surface into a surface of a sheet or the like that can be impressed with the seal image. Such impression only leaves the seal image on the surface of the sheet or the like. Thus, quantity of information that can be transferred is small and the authenticity must be judged only from the impressed seal image.

The above-described conventional techniques (2)–(4) aim to seal electronically, and accordingly quantity of information that can be transferred is large. However, it is impossible to directly seal a sheet or the like bearing information recorded in print or by handwriting.

Further, it is possible to set a sheet or the like, on which information is recorded by printing or handwriting, in a printer or the like and to print a seal image on that sheet. This case, however, is similar to the above-described technique (1) in that, as information, only the seal image is recorded on the paper. Thus, the information that can be transferred into the sheet or the like is small, and its authenticity must be judged from the seal image only. The same seal stamp often produces seal images that are different in shape. This is because force is differently applied to the seal stamp, inkpads provide different colors, and ink adheres differently to the stamp surface, frequently. Thus, it is often difficult to judge authenticity of a seal image.

More importantly, the conventional techniques require not only an electronic seal stamp but also an expensive computer for processing the identification data received from the electronic seal stamp and for processing seal image data.

Thus, in the electronic seal stamp systems of the conventional techniques (2)–(4), the electronic seal stamps are used in different manners from the ordinary seal stamp in which only a stamp surface is critical. As a result, those electronic seal stamp systems are difficult to use together with a seal stamp system that uses the conventional seal stamp and paper. Further, installation costs of the equipment is high to a user, and it is necessary to learn difficult operation of apparatuses such as a computer. Thus, it is hardly acceptable to everybody. Further, the conventional techniques (2)–(4) can not transfer a seal image to a medium—mostly paper—in which information to be approved or authenticated is written. In other words, they are used in different manners from the traditional impressing, and users feel inconvenience.

Further, at first sight, it may be felt that, in the conventional techniques (2)–(4), by printing out an electronically-sealed electronic document, the seal image can be transferred to paper. However, the printed-out document has only the printed image data that is not a transfer of the seal image of the stamp surface. Further, the printed-out sealed document has the same problem as the conventional technique (1). Namely, a shape etc. of the seal image sometimes changes depending on printer's performance etc.

Further, in the case of only electronic data as in the conventional techniques (2)–(4), it may be copied easily.

An object of the present invention is to provide, at low costs, an electronic seal stamp system which can confirm a seal image by impression similarly to the conventional seal stamp, can perform electronic sealing, gives high security, and is easy in handling.

According to the present invention, electronic sealing is performed at the same time with impression by a stamp surface. The modes of the present invention includes an electronic seal stamp, an electronic seal stamp system employing an electronic seal stamp, and the like. The electronic seal stamp of the present invention may be provided with a writer for non-contact IC sheet. To attain the above object, there is constructed an electronic seal stamp system that employs an electronic seal stamp having a stamp surface and having a storing function and an output function for electronic information. Namely, there is constructed an electronic seal stamp system using an electronic seal stamp and an electronic sheet, wherein;

the electronic seal stamp has a stamp surface and has a storing function and an output function for electronic information;

the electronic sheet is of a sheet shape, has a surface capable of being impressed, and has a storing function and an input function for electronic information; and when said electronic seal stamp is impressed on said electronic sheet, a seal image of the stamp surface of the electronic seal stamp is transferred to the surface of the electronic sheet, and, at the same time, electronic information stored in the storing function of the electronic seal stamp is transferred to the storing function of the electronic sheet through the output function of the electronic seal stamp and the input function of the electronic sheet. Here, the electronic sheet may be a non-contact IC sheet.

With this construction, it is possible to provide the electronic seal stamp system, wherein: the stamp surface can be impressed similarly to an ordinary seal stamp having only a stamp surface; and also electronic sealing can be performed.

In the above construction, there is used the electronic seal stamp that has the stamp surface and has the storing function and the output function for the electronic information. Instead, there may be used an electronic seal stamp that has a stamp surface and has a storing function, an output function and an input function for electronic information.

In a case where there are used the latter electronic seal stamp and an electronic sheet that is of a sheet shape, has a surface capable of being impressed, and has a storing function, an output function and an input function for electronic information, there is constructed an electronic seal stamp system, wherein:

when the electronic seal stamp is impressed on the electronic sheet, a seal image of a stamp surface of the electronic seal stamp is transferred to the surface of the electronic sheet;

at the same time, electronic information stored in the storing function of the electronic seal stamp is transferred to the storing function of the electronic sheet through the output function of the electronic seal stamp and the input function of the electronic sheet; and further, through the input function of the electronic seal stamp, the electronic seal stamp inputs electronic information outputted through the output function of the electronic sheet. With this construction, the electronic seal stamp system that can perform electronic sealing in addition to impression of the stamp surface is realized.

Further, the present invention includes the following.

A method of sealing with an electronic seal stamp, comprising the steps of: reading information within an electronic sheet, at the time of sealing; and transferring information within the electronic seal stamp from the electronic seal stamp to the electronic sheet, when the read information is empty.

An electronic seal stamp, wherein: information within an electronic sheet is read, at the time of sealing; and, when the read information coincides with information of the electronic seal stamp to be impressed, the information within the electronic seal stamp is transferred from the electronic seal stamp to the electronic sheet.

A method of sealing with an electronic seal stamp, comprising the steps of: reading information within an electronic sheet; and judging if the read information coincides with information of the electronic seal stamp to be impressed.

An electronic seal stamp, wherein: seal stamp information as information characteristic of the electronic seal stamp and seal stamp owner information that is information on an owner of the electronic seal stamp are transferred to an electronic sheet, at the time of sealing.

An electronic seal stamp, wherein: the electronic seal stamp has a function of storing: information read from an electronic sheet at the time of electronic sealing; the number of times of sealing from a certain point of time; or status of the electronic seal stamp.

An electronic seal stamp, wherein: information transferred from the electronic seal stamp to an electronic sheet at the time of electronic sealing is a part of contents of seal stamp information as information characteristic of the seal stamp.

An electronic seal stamp, wherein: contents of a stamp surface of the electronic seal stamp are included in contents of electronic information within the electronic seal stamp.

An electronic seal stamp, wherein an IC unit has a timer function, and a calendar function or a time-indicating function.

An electronic seal stamp, wherein a human interface unit has an LCD (Liquid Crystal Display) display function, an LED (Light-Emitting Diode) lighting function, or an electronic sound generating function.

An electronic seal stamp, wherein: a storing unit comprises a memory that can not be changed after storing of electronic information and a memory element that can be changed even after storing electronic information.

An electronic seal stamp, wherein: a detection unit comprises a pressure sensor.

An electronic seal stamp, wherein: a detection unit comprises a push-type microswitch.

An electronic seal stamp, wherein: association of a seal image of a stamp surface of the electronic seal stamp with the electronic information is registered with a certificate organization, in order to use as a registered seal having a formally-certifying function.

An electronic seal stamp, wherein: the seal stamp information and the seal stamp owner information have been encrypted.

An electronic seal stamp, wherein: a secret key of an owner or user of the electronic seal stamp and a public key of a recipient of an electronic sheet are stored, in order to encrypt seal stamp information and seal stamp owner information.

An electronic seal stamp system using an electronic seal stamp and an electronic sheet, in which the electronic seal stamp has a stamp surface and has, at least, a storing function and an output function for electronic information, and the electronic sheet is of a sheet shape and has a surface capable of being impressed and has, at least, a storing function and an input function for the electronic information, wherein:

when the electronic information is transferred from the electronic seal stamp to the electronic sheet and stored in the electronic sheet, the electronic information is encrypted by a public key system and a secret key system and thereafter stored in the electronic sheet.

An electronic seal stamp, wherein: a password or the like is inputted into the electronic seal stamp; and thereby, at the time of sealing, electronic information is sent from the electronic seal stamp.

An electronic seal stamp, wherein: the electronic seal stamp has a fingerprint identification means; and, at the time of sealing, electronic information is transferred from the electronic seal stamp to an electronic sheet, in response to a fingerprint that has been registered in the electronic seal stamp in advance.

An electronic seal stamp that has a stamp surface and, at least, a storing function and an output function for electronic information, wherein:

the electronic seal stamp is used without registering the electronic information with an certificate organization, in order to use the electronic seal stamp as a stamp that has not a formally-certifying function or a ready-made stamp.

Further, the present invention is also an electronic sheet into which electronic data is stored and characters, symbols, illustrations and the like are written. Here, a shape of the electronic sheet may not be a sheet shape, and it is sufficient if the electronic sheet has the above-mentioned function.

The present invention provides the following.

An electronic sheet that is of a sheet shape and has, at least, a storing function and an input function for electronic information, wherein: the electronic sheet has sealing column information that is information of a sealing column provided in the electronic sheet; and, at the time of sealing, seal stamp information transferred from an electronic seal stamp is stored. Further, seal stamp owner information may be also transferred from the electronic seal stamp, so that the electronic sheet stores the seal stamp owner information.

Further, the electronic sheet may recognize characters etc. written on the surface of the electronic sheet, and store corresponding electronic data. Further, the electronic sheet may store electronic data and output an object corresponding to the stored electronic data.

An electronic sheet, wherein: an antenna encloses whole the electronic sheet so that any portion of the electronic sheet receives transfer of electronic information from an electronic seal stamp.

An electronic sheet, wherein: a sealing column in the electronic sheet is enclosed by an antenna, so that transfer of electronic information from an electronic seal stamp is received at a sealing position.

A system for registering seal stamp information and seal stamp owner information possessed by an electronic seal stamp with a certificate organization, wherein: association of a seal image of the electronic seal stamp with the seal stamp information and the seal stamp owner information is registered.

An electronic seal stamp check system that judges validity and authenticity of an electronic seal stamp at the time of sealing, comprising: a certificate authority that judges validity and authenticity of the electronic seal stamp; a reading means for reading electronic information within the electronic seal stamp; an antenna used for the reading means to communicate with the electronic seal stamp; an inquiry means for sending the read electronic information to the certificate authority and for receiving a judgement result from the certificate authority; and a network for connecting the certificate authority and the inquiry means.

An electronic seal stamp check system that judges validity of an electronic seal stamp used for sealing, comprising: a reading means for reading period of validity information stored in the electronic seal stamp and period of validity information stored in an electronic sheet; and an antenna used for the reading means to communicate with the electronic seal stamp and the electronic sheet.

An electronic sealing monitoring system that monitors information sent and received between an electronic seal stamp and an electronic sheet at the time of sealing, comprising: a reading means that reads sending and receipt of information between the electronic seal stamp and the electronic sheet; an antenna used for the reading means to pick up communication between the electronic seal stamp and the electronic sheet; and a display means for displaying picked information.

An electronic writing implement, having: a storing function for storing electronic information; a detection function for detecting an angle and acceleration; and an input and output function for inputting and outputting the electronic information and information obtained by the detection function.

Here, this electronic writing implement may have a writing function for recording information on a medium (for example, on paper) that can record information physically or optically.

An electronic signature system comprising an electronic writing implement and an electronic sheet that is of a sheet shape and has a surface capable of being impressed, and has, at least, a storing function and an input function for electronic information, wherein:

when the electronic writing implement is used to write on the electronic sheet, handwriting by the electronic writing implement is transferred to a surface of the electronic sheet, and, at the same time, the electronic information stored in the storing function of the electronic writing implement is transferred to the storing function within the electronic sheet through the output function of the electronic writing implement and input function of the electronic sheet.

According to the present invention, it is possible to provide, at low cost, an electronic seal stamp system that can confirm a seal image by impression, similarly to the conventional seal stamp, can perform electronic sealing, gives high security, and is easy in handling.

Further, according to the present invention, it is possible to store seal stamp information and seal stamp owner information into an electronic seal stamp, and to store a plural pieces of information into an electronic sheet, in order to transfer the seal stamp information and seal stamp owner information to an IC chip within the electronic sheet at the time of sealing by the electronic seal stamp.

Further, according to the present invention, it is possible to confirm a seal image by impression, since the electronic seal stamp has a stamp surface, similarly to the conventional seal stamp, and the seal image can be transferred by applying ink to the electronic seal stamp and impressing that electronic seal stamp.

Further, according to the present invention, seal stamp information and seal stamp owner information within an electronic seal stamp is written into an IC chip within an electronic sheet, and thereby, it is possible to seal electronic information within the IC chip.

Further, according to the present invention, it is possible to increase security, since an injustice can be easily found by comparing a seal image transferred by impression and seal stamp information and seal stamp owner information written into an IC chip within an electronic sheet.

Further, according to the present invention, the conventional way of handling a seal stamp, such as impressing, is employed so that it is easy in handling.

Further, according to the present invention, a user who gives signature by a seal stamp needs to possess an electronic seal stamp, and thus, an electronic seal stamp system can be constructed at lower costs.

The present invention will be described as follows.

Conventionally, in the case of impression on a paper document (the conventional technique (1)), it is difficult to judge authenticity of a transferred seal image. Further, in the case of the conventional electronic sealing (the conventional techniques (2)–(4)), it is impossible to transfer (impress) a seal image on a paper document. In these conventional techniques, only a copy of a seal image is printed, and certifying (authorizing) ability is low. These problems have been caused since it is impossible to perform electronic sealing or electronic writing on a medium (document) such as paper that records or describes information physically or optically. Further, these problems have been caused also since it is impossible to transfer (to physically impress) a seal image or to perform physically writing on an electronic data document.

To solve these problems, the present invention performs electronic sealing and realizes electronic writing or signature on a medium in which information is held. In detail, one mode of the present invention provides an electronic medium that stores impressed (transferred) contents or electronic data corresponding to the written contents, into paper on which writing is possible. Examples of this electronic medium include a paper-shaped electronic sheet. Further, examples of the electronic medium include one that recognizes a transferred seal image and stores seal image information corresponding to that seal image. Further, this electronic medium stores seal stamp information or writing information correspondingly to transferred or written contents, at the same time with the impression (transfer) or writing. For example, it stores seal stamp information or writing information transferred from an electronic seal stamp or electronic writing implement. Here, both seal stamp information and writing information may be used in the present invention.

Further, the present invention realizes both electronic sealing and writing and physical impression (transfer) and writing.

The present invention is also constructed as follows.

Namely, the present invention provides a method of electronic writing in which writing on a medium is performed by using a writing means capable of writing characters or symbols on the medium, wherein, in accordance with a user of the writing means making a writing movement on the medium, following steps are carried out:

a writing step of writing characters or symbols, which correspond to the writing movement, on the medium;
  a sending step of sending electronic information that identifies the writing means, from the writing means, correspondingly to the writing step; and
  a storing step of storing the electronic information into a storing means related to the medium, associating the electronic information with the medium.

Further, the present invention provides an electronic writing implement that outputs electronic information, comprising:

a writing means that writes characters or symbols on a medium, with the characters or symbols corresponding to a writing movement of a user of the electronic writing implement on the medium; and
  a sending means for sending electronic information that identifies the electronic writing means, to a storage device, correspondingly to writing by the writing means.

Further, the present invention provides a method of giving approval to information held in a medium, by using a seal stamp that can transfer a seal image of a stamp surface to the medium, wherein, in accordance with a user of the seal stamp making a sealing movement on the medium, following steps are carried out:

a transferring step of transferring the seal image to the medium; and
  a sending step of sending electronic information that identifies the seal stamp to a storing means related to the medium, associating the electronic information with the medium; and
  wherein, authenticity of the approval on the information held in the medium can be confirmed using the stored electronic information and transferred seal image.

BRIEF DESCRIPTION OF THE DRAWINGS

FIG. 5 shows seal stamp owner information of one embodiment of the present invention;

FIG. 6 shows seal stamp registration information of one embodiment of the present invention;

FIG. 7 shows seal stamp registration information, which has seal image data, of one embodiment of the present invention;

FIG. 18 shows information to be stored in an electronic sheet of one embodiment of the present invention;

FIG. 35 is a flowchart for sending and receiving money data in the electronic seal stamp system shown in FIG. 34.

DETAILED DESCRIPTION

Embodiments of the present invention will be described referring to FIGS. 1–35.

(1. Electronic Seal Stamp System Using an Electronic Sheet)

(1.1 Outline of the System)

Figure 1:
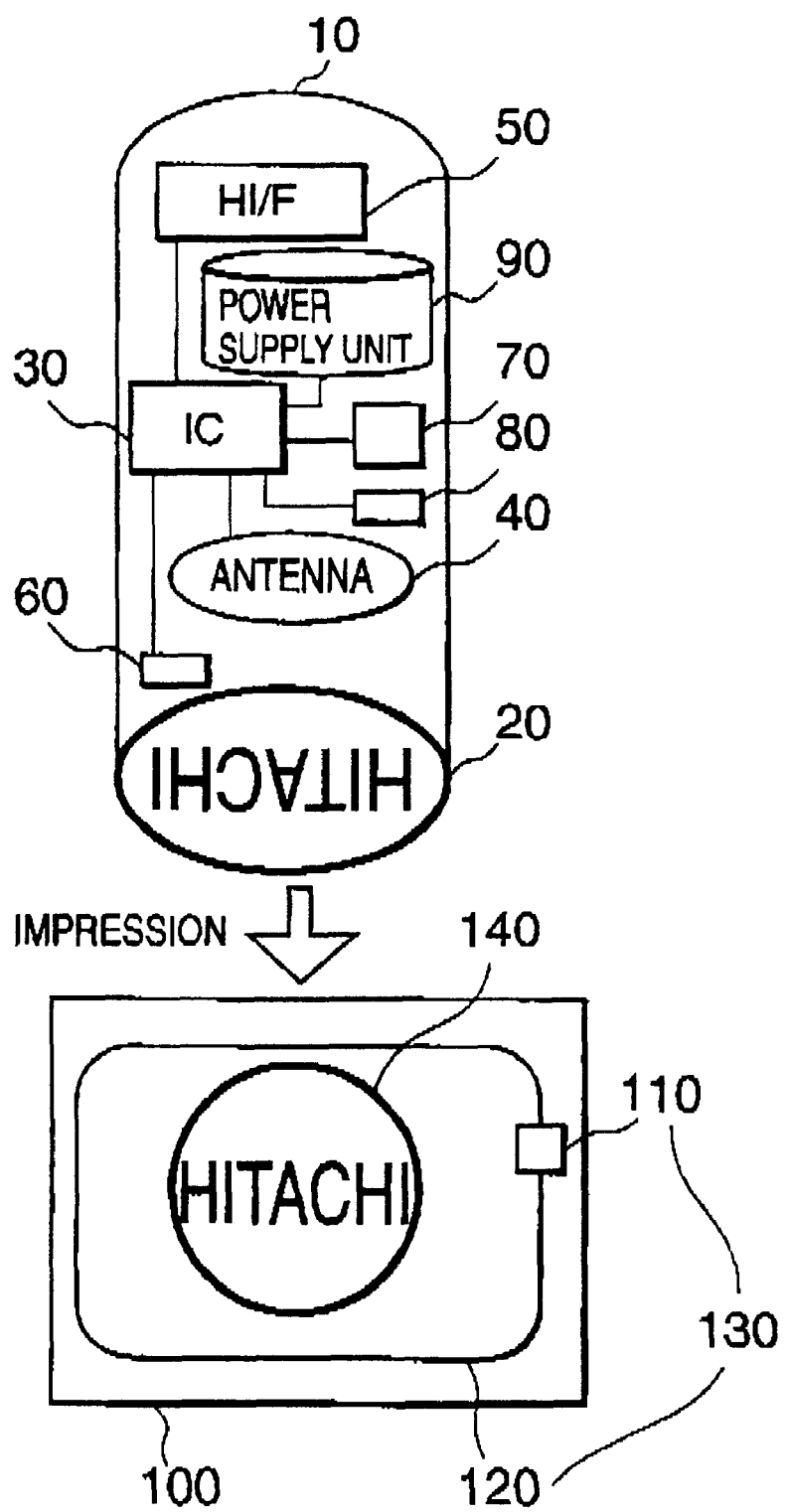
FIG. 1 is a configuration of an electronic seal stamp system using an electronic sheet, according to an embodiment of the present invention.

FIG. 1 is a view showing a configuration of an electronic seal stamp system that combines an electronic sheet and an electronic seal stamp. The electronic seal stamp system according to the present invention comprises the electronic seal stamp 10 and the electronic sheet 100.

Outline of the electronic seal stamp system of the present invention is as follows.

The electronic seal stamp is similar to the conventional seal stamp in that ink is adhered to the electronic seal stamp, and then, the electronic seal stamp is impressed. When the electronic seal stamp 10 is impressed on the electronic sheet 100, the impression is detected and information recorded in an IC unit 30 of the electronic seal stamp is transmitted from an antenna unit 40, while a seal image 140 of a stamp surface 20 is transferred to the surface of the electronic sheet. The electronic sheet 100 receives the information at its antenna unit 120, and records it into an IC chip unit 110. Here, a transfer of the information within the electronic seal stamp from the electronic seal stamp to the electronic sheet is referred to as "electronic sealing".

(1.2 Electronic Seal Stamp (Electronic Registered-seal))

(1.2.1 Configuration of the Electronic Seal Stamp)

Figure 2:
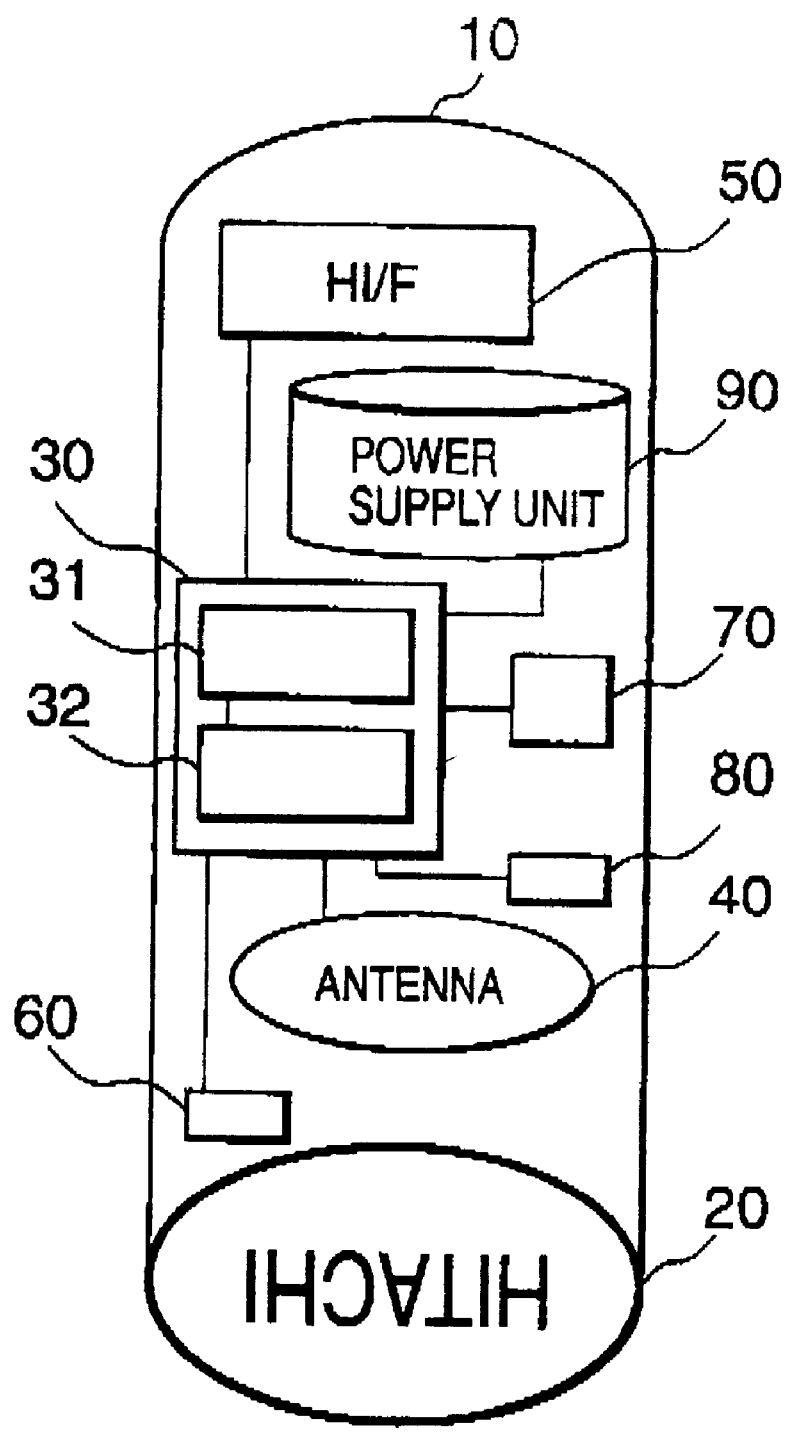
FIG. 2 is a configuration of an electronic seal stamp as one embodiment of the present invention.

FIG. 2 is a view showing a more detailed configuration of the electronic seal stamp. The electronic seal stamp 10 comprises the stamp surface 20 for transferring the seal image at the time of impression similarly to the ordinary seal stamp, the IC unit 30 for storing the seal stamp information and for controlling the circuit, the antenna unit 40 for exchanging information with the IC within the electronic sheet, a human interface (human I/F) unit 50 for displaying a state of the electronic seal stamp and a state of the electronic sheet, a detection unit 60 for detecting impression, a switch unit 70 for selecting a mode of the electronic seal stamp, a reset switch unit 80 for resetting the circuit of the IC unit 30, and a power supply unit 90 for supplying power to the electronic seal stamp.

The IC unit 30 comprises a processing unit 31 for carrying out the circuit control, and a storing unit 32 for storing electronic information. The processing unit 31 has a timer function.

Figures 3, 4:
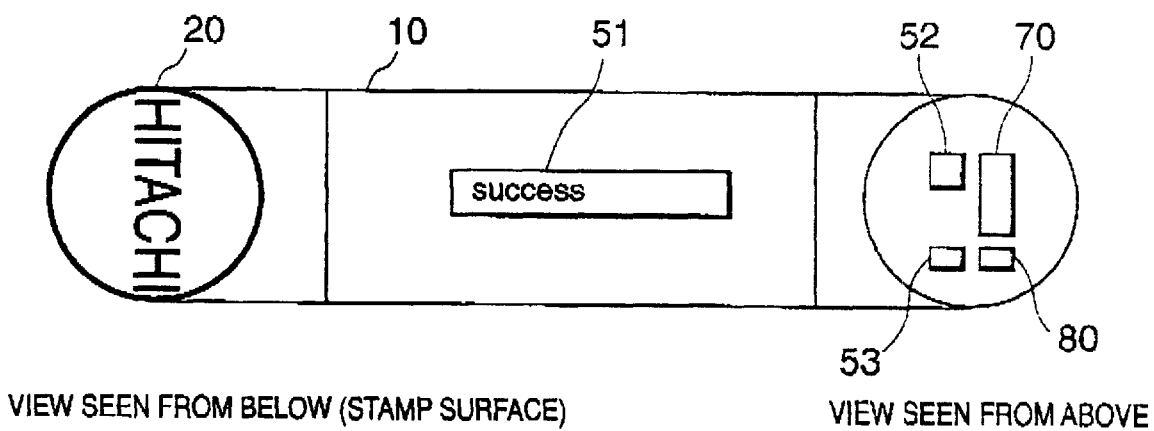
FIG. 3 is a view showing an outside interface of the electronic seal stamp of one embodiment of the present invention.
FIG. 4 shows seal stamp information of one embodiment of the present invention.

The human interface unit 50 has an LCD display function, an LED lighting function, and an electronic sound generating function. FIG. 3 is a view showing an appearance of the human interface unit 50, with the reference numeral 51 referring to an LCD display unit, 52 to an LED lighting unit, and 53 to an electronic sound generating unit. The detection unit 60 is, for example, a pressure sensor or a microswitch.

In the switch unit 70, a mode is selected out of a sealing mode, a correction mode, a check mode, a display mode and an OFF mode. The sealing mode is a mode for performing electronic sealing. The correction mode is a mode for sealing again an electronic sheet that has already been electronically sealed. The check mode is a mode for investigating if an electronic sheet already having an electronic seal is sealed by the same electronic seal stamp. The display mode is a mode for displaying the information within the electronic seal stamp onto the human interface unit. The reset switch 80 is used for restoring the information temporarily stored in the above-mentioned storing unit to the initial condition. The power supply unit 90 employs a rechargeable battery or an ordinary disposable battery.

When a rechargeable battery is used, charging terminals may be provided on the outside of the electronic seal stamp 10. Then, in combination with a charging stand that can charge the rechargeable battery within the electronic seal stamp, it is possible to charge the rechargeable battery while it is kept inside the electronic seal stamp. Such a charging function may be provided to a case for the electronic seal stamp.

(1.2.2 Information Registered in the Electronic Seal Stamp)

If necessary, the information stored in the storing unit 32 of the electronic seal stamp is authenticated by a certificate authority and encrypted. Rewrite and modification of the information registered at the certificate authority are performed through the certificate authority. Further, all the information may be encrypted, or it may be partly encrypted. The information stored in the storing unit 32 comprises seal stamp information 210 and seal stamp owner information 220.

The seal stamp information 210 (FIG. 4) is information characteristic of the electronic seal stamp, and comprises, for example, seal stamp identification information 211, seal image information 212 (FIG. 4), and the period of validity 213. The seal stamp identification information 211 is an identification number, an identification symbol, or a combination of them. The seal image information 212 is seal image data of the electronic seal stamp in question, feature data representing features of the seal image, or a seal image registration number corresponding to the seal image registered with the certificate authority. The period of validity 213 represents a time limit until which the information registered in the electronic seal stamp is effective. The period of validity 213 may be expressed by year, month, day, and time.

On the other hand, the seal stamp owner information 220 is information that specifies an owner and/or user of the electronic seal stamp 10. For example, as shown in FIG. 5, the seal stamp owner information 220 consists of necessary pieces of information out of a full name 221, a name number 222, an address 223, a telephone number 224, an E-mail address 225, and the like. Instead of the name and the name number, a corporate name (trader name) and a corporate registration number (trader registration number) may be used. Depending on a storage capacity of the storing unit 32, the number of items may be increased or decreased at will.

(1.2.3 Information Transferred by Electronic Sealing)

Information that is transferred from the electronic seal stamp to the electronic sheet by electronic sealing is the above-mentioned seal stamp information 210 and/or seal stamp owner information 220.

From the seal stamp information 210, information transferred to the electronic sheet by electronic sealing is the above-mentioned seal stamp identification information 211, seal image information 212, and period of validity 213. Sometimes, all of the contents of the seal stamp identification information 211 is not transferred, and only a part of the contents is transferred. This prevents use of the seal stamp information transferred to the electronic sheet to duplicate the electronic seal stamp.

The seal image information 212 and the period of validity 213 transferred to the electronic sheet are read at the time of sealing or after sealing, and used for judging the authenticity and validity of the electronic seal stamp.

Out of the seal stamp owner information 220, information transferred to the electronic sheet by electronic sealing may be all items constituting the seal stamp owner information, or a part of them. Further, the information transferred may be encrypted, if necessary.

In the present embodiment, the information is transferred to the electronic sheet. However, the information may be transferred to a computer of the certificate authority or a destination of the document. In that case, it is better to add information specifying the sealed document to the information to be transferred. This case is shown in FIGS. 31 and 32.

Figure 31:
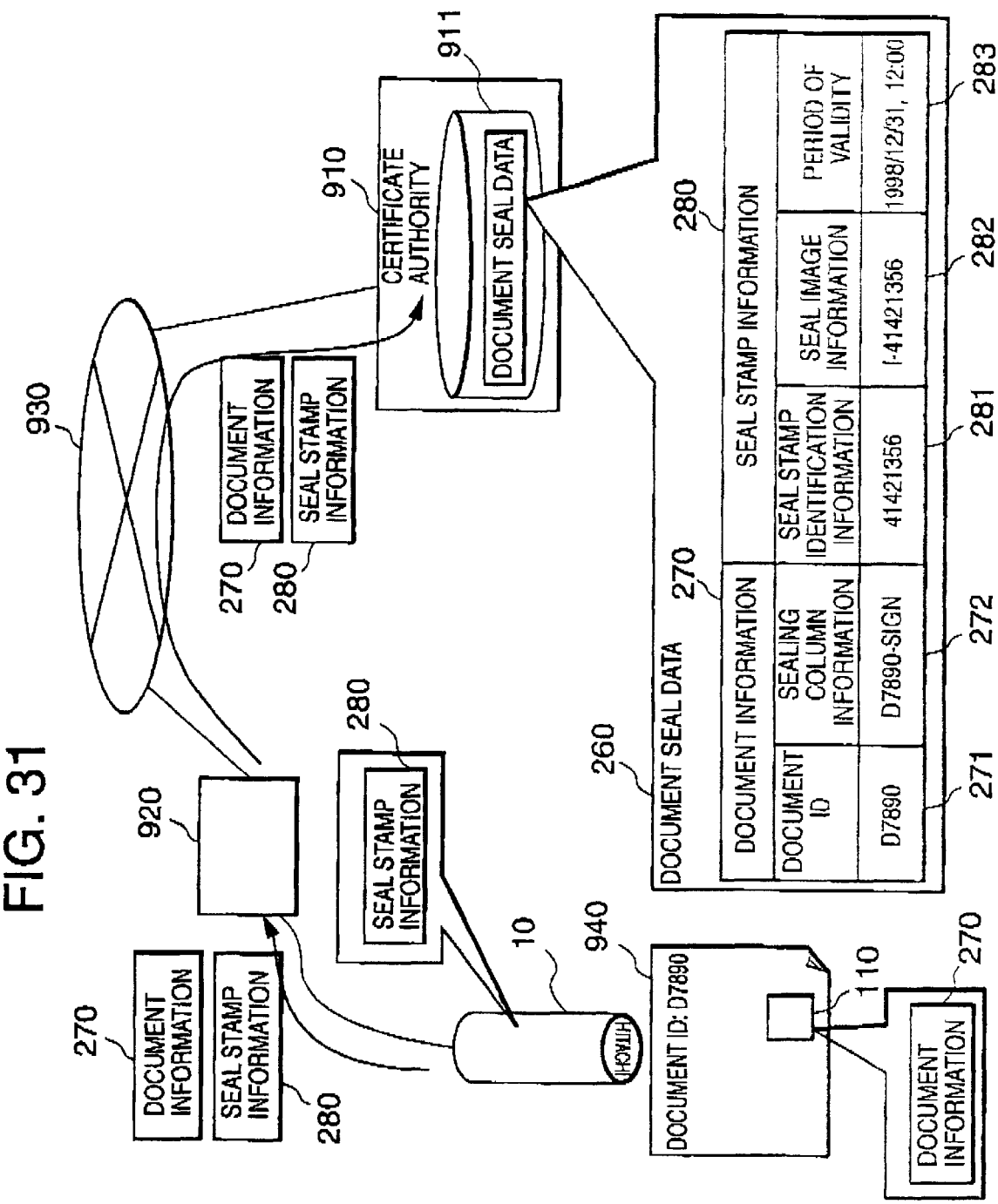
FIG. 31 is a view showing a configuration of an electronic seal stamp system, in which seal stamp information is transferred to a certificate authority.
Figure 32:
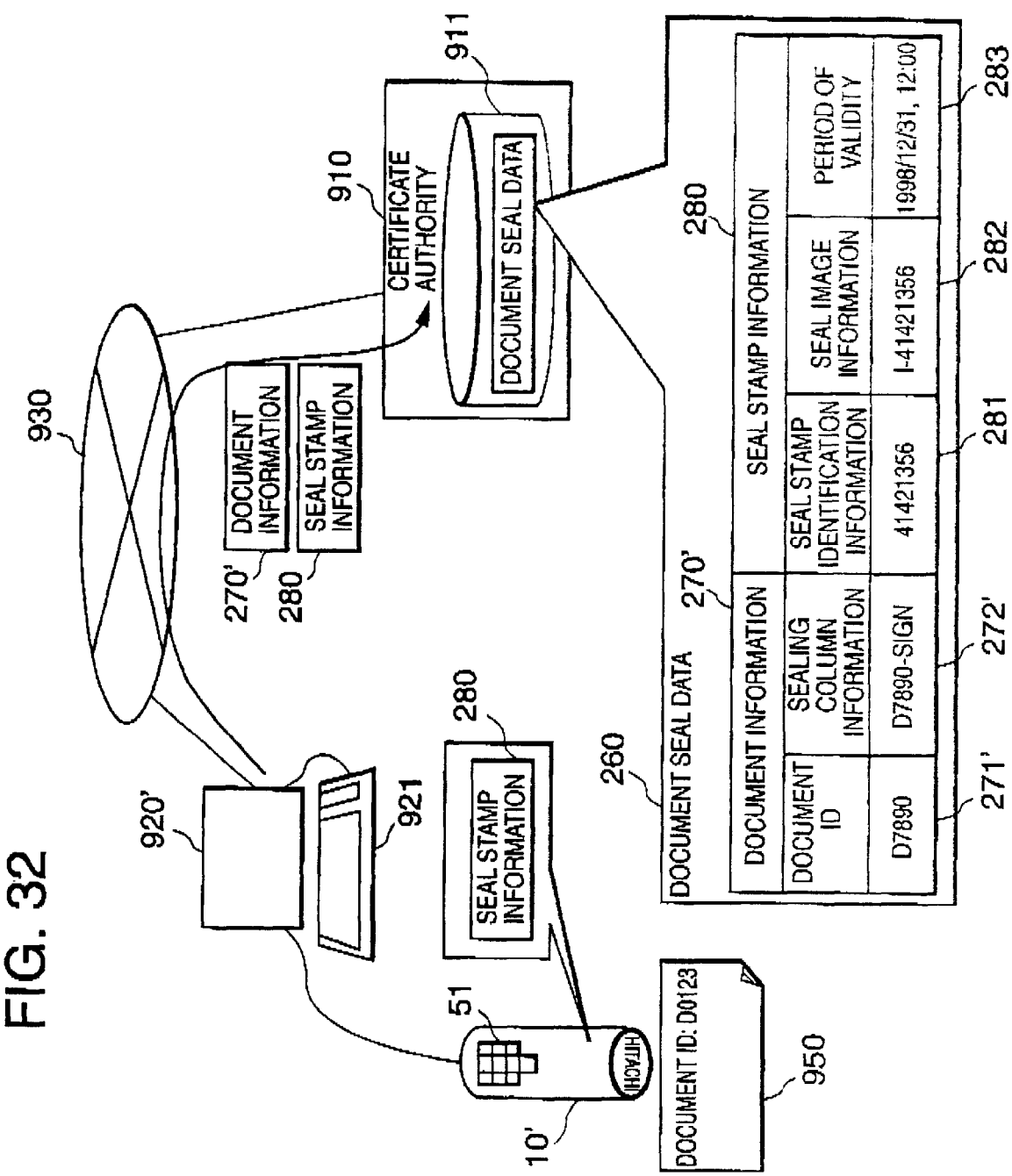
FIG. 32 is a view showing a variation of the electronic seal stamp system shown in FIG. 31, in which seal stamp information is transferred to the certificate authority.
Figure 33:
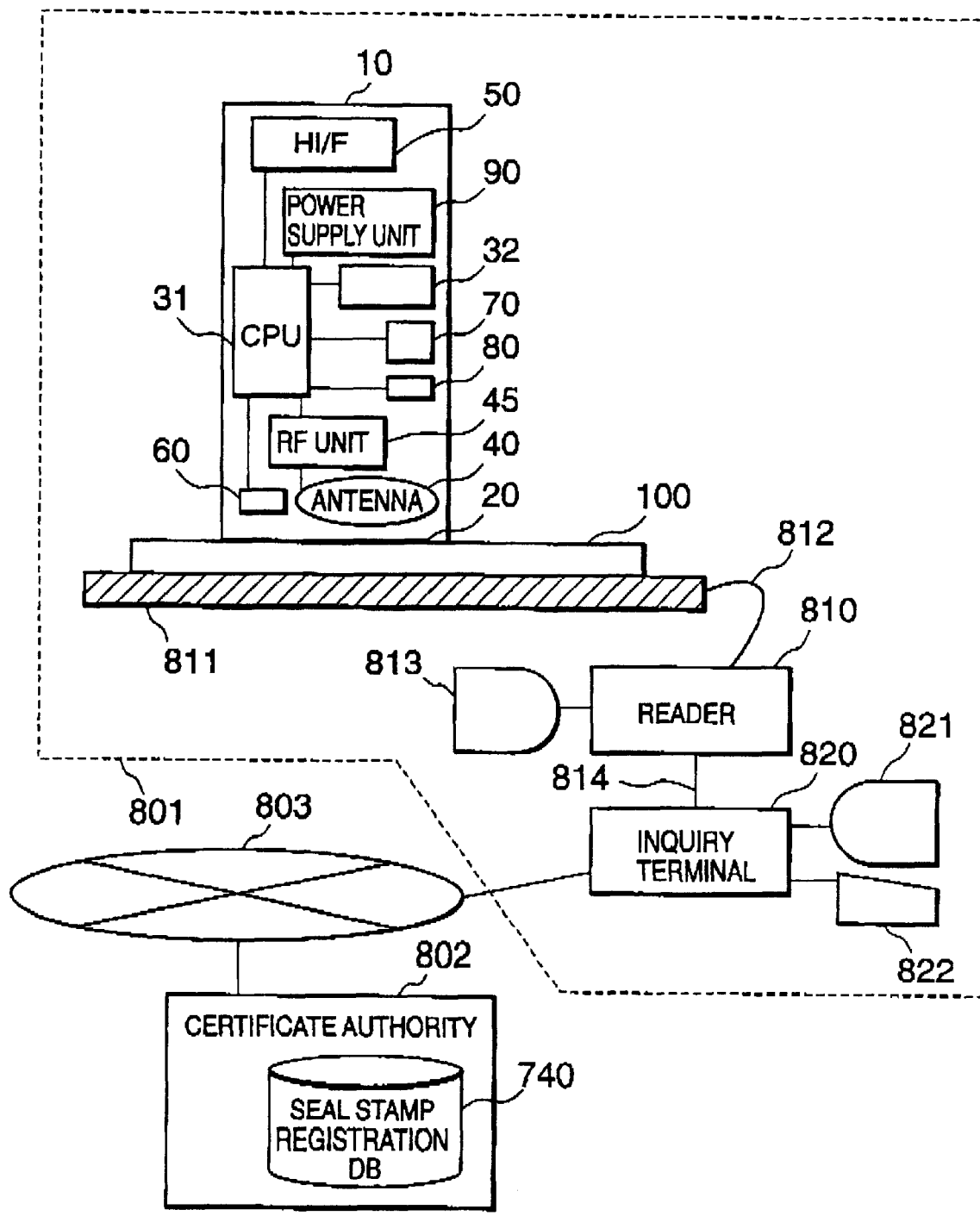
FIG. 33 is a view showing a variation of the duplication check system for an electronic seal stamp shown in FIG. 23.

First, FIG. 31 will be referred to. The electronic seal stamp 10 sends and receives information to and from a communication terminal 920. In the present embodiment, they are connected by wire. However, information may be sent and received by wireless. When a user of the electronic seal stamp 10 makes an impressing movement, then, the seal stamp information 280 stored in the electronic seal stamp 10 is sent to the communication terminal 920. This seal stamp information is shown in FIG. 31, and may be same as the above-described embodiment. Further, responding to the impressing movement, document information 270 stored in the electronic sheet 940 and relating to the document written in the electronic sheet is sent from the electronic sheet to the communication terminal through the electronic seal stamp. This document information is stored in the IC chip unit 110. The document information 270 is suitable if it can distinguish the document from another document. The document information shown in FIG. 31 works. Or, for example, a document ID such as a number, the contents of the document themselves, an abstract of the contents, or the like may be used. Further, the electronic seal stamp 10 may recognize the document information 270 and absorb it from the electronic sheet. Or, the electronic sheet may detect the impression and send the document information to the electronic seal stamp 10.

The communication terminal 920 is connected to the certificate authority 910 through the network 930. The certificate authority 910 has a document seal DB (database) 911 for storing the transferred document information 270 and seal stamp information 280. For collating or the like of the electronic seal stamp, it suffices to use the electronic sheet and the document seal DB 911. Further, as the electronic seal stamp, an electronic pen described below referring to FIG. 24 may be used. Further, the seal stamp information 280 may be sent to the electronic sheet so that also the electronic sheet stores that information.

Next, a variation of FIG. 31 will be described. FIG. 32 is a view illustrating that the present invention can be applied to ordinary paper (sheet) 950 instead of the electronic sheet. First, before an impressing movement, a user of the electronic seal stamp 10' uses a key input unit 51 to input document information 270 of a document to be sealed. This document information 270 may be same as the document information shown in FIG. 31. Further, the input may be carried out after the impressing action. Then, similarly to FIG. 31, the electronic seal stamp 10' sends the document information and the seal stamp information to the communication terminal 920'. Then, the communication terminal 920' sends the document information and the seal stamp information to the document seal DB of the certificate authority 910 through the network 930.

Here, the electronic seal stamp may not have the key input unit 51 and the document information may be inputted through the communication terminal 920'. In that case, a keyboard 921 provided to the communication terminal 920' may be used to input.

Further, prescribed data may be sent from the electronic seal stamp to the electronic sheet in response to a request of the electronic sheet. For example, this applies in such a case that a user is charged when he impresses the electronic seal stamp on the electronic sheet. This case will be described referring to FIGS. 34 and 35.

Figure 34:
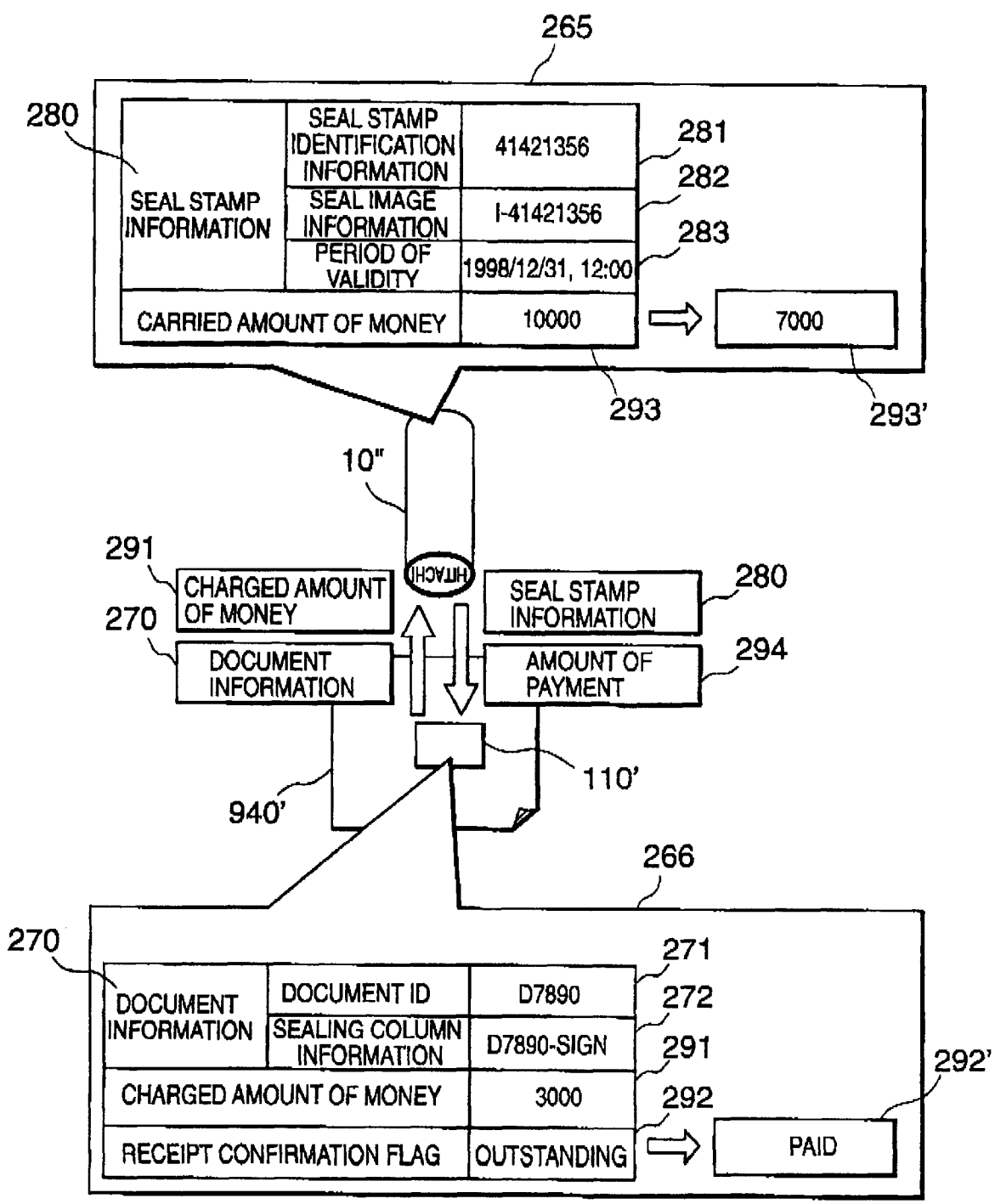
FIG. 34 is a view showing a configuration of an electronic seal stamp system in which money data is sent from an electronic seal stamp to an electronic sheet at the time of sealing.

FIG. 34 is a view showing an outline. The electronic seal stamp 10" sends and receives electronic information to and from the IC chip unit 110' of the electronic sheet 940'. The electronic seal stamp 10" stores the seal stamp information 280 and a carried amount of money 293 as prepaid money information. The IC chip unit 110' of the electronic sheet 940' stores the document information 270, a charged amount of money 291 as an amount of money charged on the user of the electronic seal stamp, and a receipt confirmation flag 292 for confirming payment of the user.

FIG. 35 shows respective process flowcharts for the electronic seal stamp and electronic sheet at the time of electronic sealing. The flowchart starting with Step 1101 is the flowchart for the electronic seal stamp 10", and the flowchart starting with Step 1111 is the flowchart for the electronic sheet 940'.

When the user uses the electronic seal stamp 10" to seal, the seal stamp information 280 is sent from the electronic seal stamp 10" to the electronic sheet 940 (1102). On receiving the seal stamp information 280 (1112), the electronic sheet 940' sends the charged amount of money 291 to the electronic seal stamp 10" (1113). On receiving the charged amount of money 291 (1103), the electronic seal stamp 10" subtracts the charged amount of money from the carried amount of money 293 when the carried amount of money is larger than the charged amount of money (1104). In FIG. 34, the charged amount of money is 3000 yen, and accordingly, the carried amount of money becomes 7000 yen after the subtraction (293'). The electronic seal stamp 10" transmits the amount of payment 294 to the electronic sheet 940' (1105). On receiving the amount of payment 294 (1114), the electronic sheet 940' changes the receipt confirmation flag 292 into the paid 292' when the charged amount of money is equal to the paid amount (1115). After confirmation of the receipt, the electronic sheet 940' sends the document information 270 to the electronic seal stamp 10" (1116). Then, the electronic seal stamp 10" receives the document information 270 to finish the processing.

As described above, charging to the user of the electronic sealing is carried out in such a way that the charged amount of money is sent from the electronic sheet to the electronic seal stamp at the time of electronic sealing, then, in response, the electronic seal stamp subtracts the charged amount from the carried amount of money and thereafter sends the amount of payment corresponding to the charged amount to the electronic sheet, and the electronic sheet receives the amount sent.

In the above, the amount of payment 294 is sent from the electronic seal stamp to the electronic sheet. However, it may be sent to a computer of the destination of the document or of a station that manages the accounting. In that case, it is better to send the seal stamp information 280 and the document information 270 in addition to the amount of payment.

Although the electronic seal stamp is used in FIGS. 34 and 35, an electronic pen that has a money payment function similarly to the electronic seal stamp 10" may be used instead.

(1.2.4 Registration of the Electronic Seal Stamp)

The electronic seal stamp of the present embodiment is used after registration with the public certificate authority. Although, in the present embodiment, the electronic seal stamp is registered, the electronic seal stamp may not be registered with the certificate authority. The certificate authority registers seal stamp registration information 230 (FIG. 6) consisting of the seal stamp identification information 211 as identification information characteristic of the electronic seal stamp, the seal image information 212 of the electronic seal stamp, the period of validity 213, and the seal stamp owner information 220.

When the seal image information 212 is information indicating the seal image, the seal image data 241 is registered together (FIG. 7).

Figure 8:
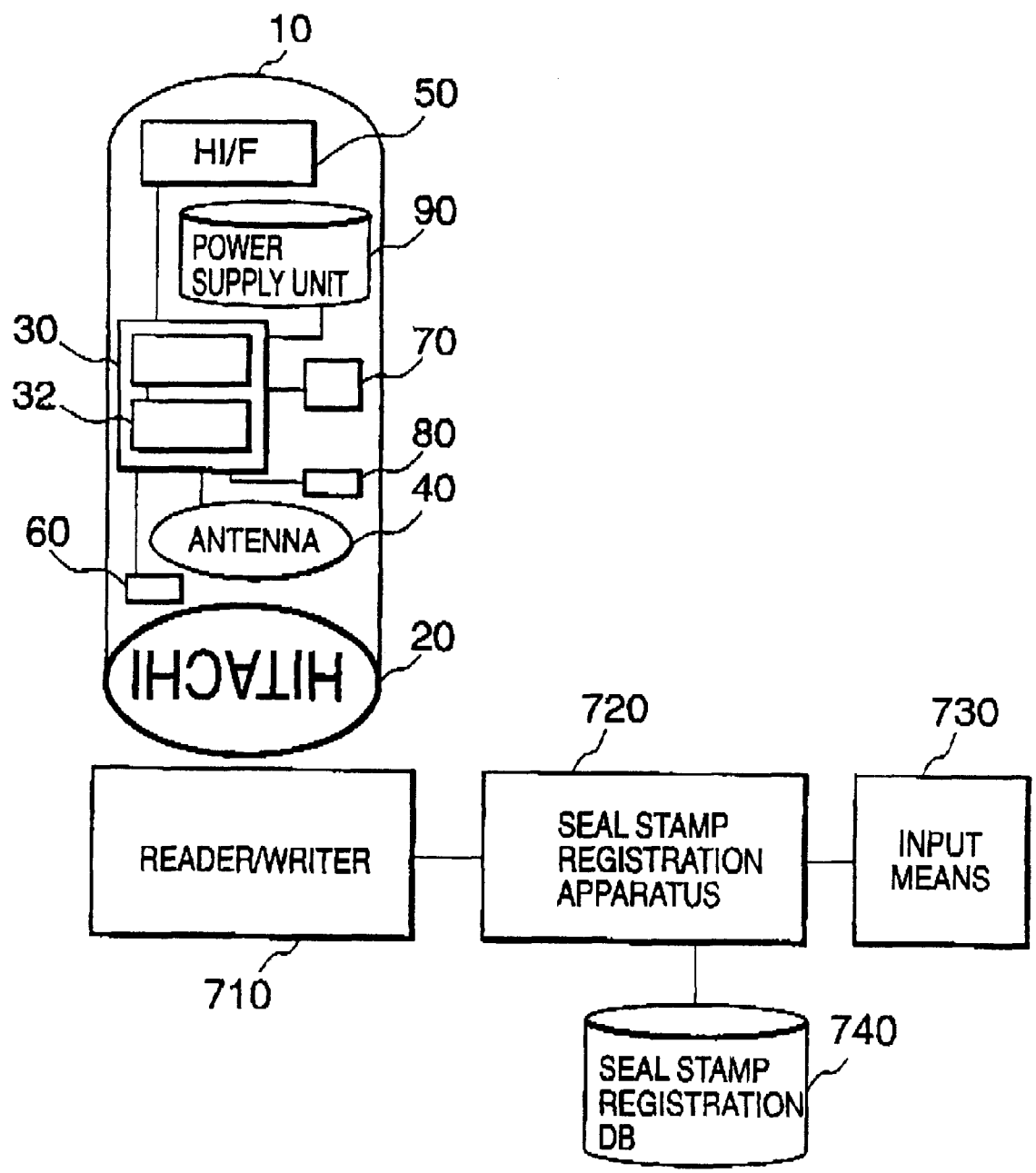
FIG. 8 is a view showing a seal stamp registration system of one embodiment of the present invention.

FIG. 8 shows an example of a system for registering the electronic seal stamp in the certificate authority. A reader/writer 710 reads and writes information from and to the electronic seal stamp.

An seal stamp registration apparatus 720 is an apparatus for entering the seal stamp registration information 230 or the seal stamp registration information 240 into a seal stamp registration database 740.

An input means 730 is used to input the seal image information, the seal stamp owner information, and, according to circumstances, the seal stamp identification information.

The electronic seal stamp registered with the certificate authority as described above is referred to as an electronic registered-seal. When the electronic seal stamp is registered, it has a formally-certifying function in order to identify its owner similarly to a conventional registered seal.

Further, in a case where the period of validity 213 is used being stored in the electronic seal stamp, it is required that the registration is renewed in the certificate authority by the deadline indicated by the period of validity 213.

Here, the information stored in the electronic seal stamp 10 is sent to the seal stamp registration DB 740. However, another apparatus may send the information to both the electronic seal stamp 10 and seal stamp registration DB 740. "Another apparatus" is managed by the user/owner of the electronic seal stamp 10, and has the seal stamp information 210 etc.

(1.2.5 Operation of the Electronic Seal Stamp)
(1.2.5.1 Sealing Mode Processing)

Figure 9:
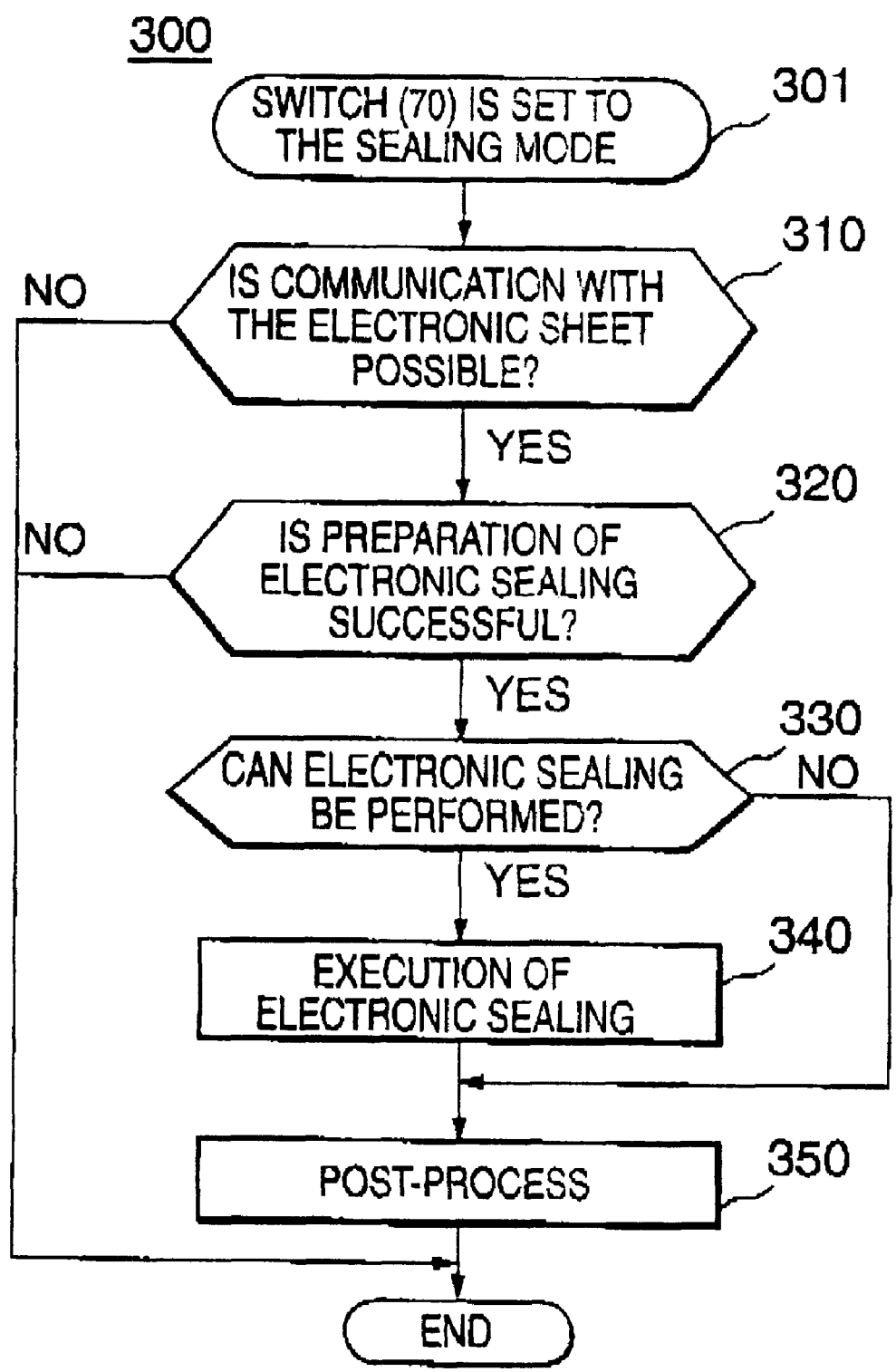
FIG. 9 is a process flowchart of a sealing mode for an electronic seal stamp of one embodiment of the present invention.

FIG. 9 shows a process flowchart for processing of electronic sealing in the sealing mode.

When the electronic seal stamp 10 is impressed while its switch unit 70 is held at the sealing mode, the seal stamp information 210 and the seal stamp owner information 220 stored in the electronic seal stamp 10 are transferred to the electronic sheet.

The processing in FIG. 9 is described in detail as follows. When the user turns the switch unit 70 of the electronic seal stamp 10 into the sealing mode (301), the information is read from the electronic sheet 100 to execute a confirmation process for confirming the possibility of communication with the electronic sheet 100 (310). When the possibility of communication is confirmed (310Y), a preparatory process for the electronic sealing is executed (320). When the preparation succeeds (320Y), an electronic sealing execution process is executed (340) and a post-process is executed in the end (350).

Figure 10:
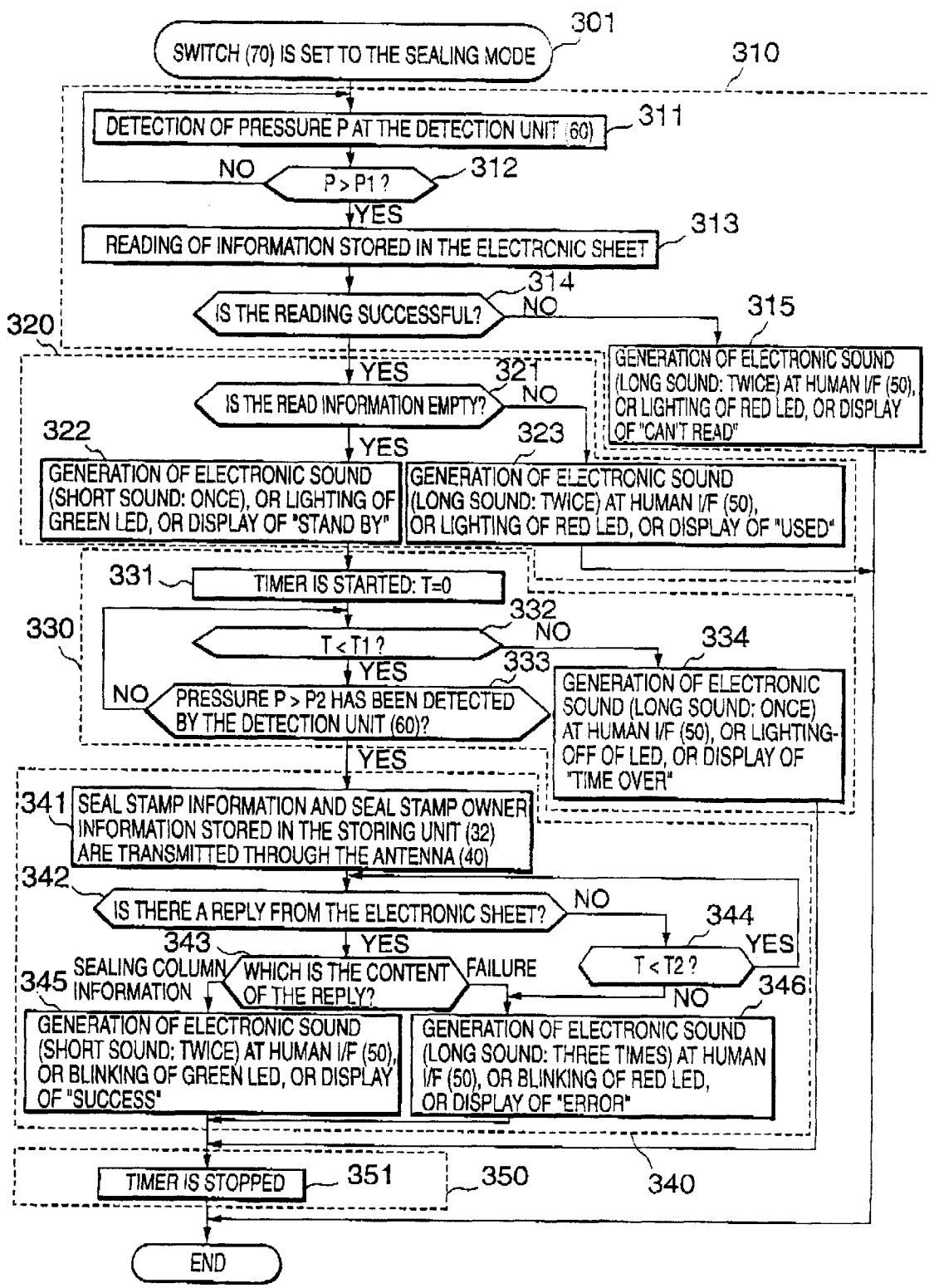
FIG. 10 is a detailed process flowchart of a sealing mode for electronic seal stamp of one embodiment of the present invention.

FIG. 10 is a process flowchart showing an example of the electronic sealing in the sealing mode.

In the following, the flow of this processing will be described. When the user turns the switch unit 70 of the electronic seal stamp 10 into the sealing mode (301), the detection unit 60 detects the pressure P (311). Then, it is judged if the detected pressure P is larger than a predetermined pressure P1 (312). When it is larger (312Y), the information stored in the electronic sheet 100 is read. At that time, when the reading ends in failure (314N), indication of the failure is given at the human I/F 50 (315), and the processing is ended. Here, as the indication of the failure, a message "can't read" may be displayed, for example. On the other hand, when the reading is successful (314Y), it is investigated if the seal stamp information 210 is empty in the information read (321). When the seal stamp information 210 has been recorded (321N), indication to the effect that the information has been recorded is given at the human I/F 50 (323), to end the processing. As the indication to the effect that the information has been recorded, a message "used" or the like may be displayed. On the other hand, when the seal stamp information 210 is empty (not recorded) (321Y), indication to that effect is given at the human I/F 50 (322). As the indication to the effect that the seal stamp information is empty, a message "stand by" or the like may be displayed. Then, the timer is started (331), and in the range of T<T1, the detection unit 60 judges if the pressure P is larger than P2 (P>P2) (322 and 333). On this occasion, when T becomes T≧T1 (332N), indication to that effect is given at the human I/F 50. As this indication, a message "time over" or the like may be displayed, for example. Then, after stopping the timer (351), the processing is ended. On the other hand, when, in the range of T<T1, the detection unit 60 detects such a pressure P as P>P2 (333Y), the seal stamp information 210 and the seal stamp owner information 220 stored in the storing unit 32 is sent to the electronic sheet 100 through the antenna 40 (341). And, in the range of T<T2, a reply from the electronic sheet 100 is awaited (342 and 344). When there is a reply (342Y) and the content of the reply is sealing column information (343), indication to that effect is given at the human I/F 50. As this indication, a message "success" or the like may be displayed, for example. After that indication, the timer is stopped (351) and the processing is ended. On the other hand, when there is no reply in the range of T<T2 (344N) or when the content of the reply is a failure (343), indication to the effect of being the failure is given at the human I/F 50 (346). As this indication, a message "error" or the like may be displayed, for example. After that indication, the timer is stopped (351), and thereafter the processing is ended.

In the present embodiment, the electronic seal stamp 10 sends the seal stamp information 210 and the seal stamp owner information 220 to the electronic sheet 100. However, only the seal stamp information 210 may be sent, without sending the seal stamp owner information 220.

In the detailed process flowchart of the sealing mode, P1 is a threshold of the pressure at which it is judged that the stamp surface comes into contact with the surface of the electronic sheet. P2 is a threshold of the pressure at which it is considered that the seal image is transferred from the stamp surface to the surface of the electronic sheet etc. T1 is a time-out value for judging that sealing was started but has not been accomplished. T2 is a time-out value for judging that the seal stamp information and the seal stamp owner information were sent from the electronic seal stamp to the electronic sheet, but no reply has been received from the electronic sheet.

In the process of the electronic sealing, the status of the operation is suitably confirmed at the human interface unit (human I/F) 50.

Thus, the electronic seal stamp has the function of confirming that the information is certainly transferred to the electronic sheet when it is impressed. According to this function, even when the electronic seal stamp is impressed on the outside of the column that can be electronically sealed, it is possible to recognize that the electronic seal stamp is impressed outside the column.

In the meantime, electronic sealing can be performed, not according to the present flow of the processing. For example, at the time of sealing, turning of the switch 70 into the sealing mode may cause execution of the electronic sealing process 340.

In the present embodiment, the information is sent from the electronic seal stamp. However, the information may be sent from another apparatus than the electronic seal stamp 10. In that case, the electronic seal stamp 10 itself may hold the information or not. In the case that the electronic seal stamp holds the information, the system may be so constructed that, when the information of the above-mentioned another apparatus and the information of the electronic seal stamp 10 coincide in comparison, the information is sent to the electronic sheet 100.

(1.2.5.2 Correction Mode Processing)

Figure 11:
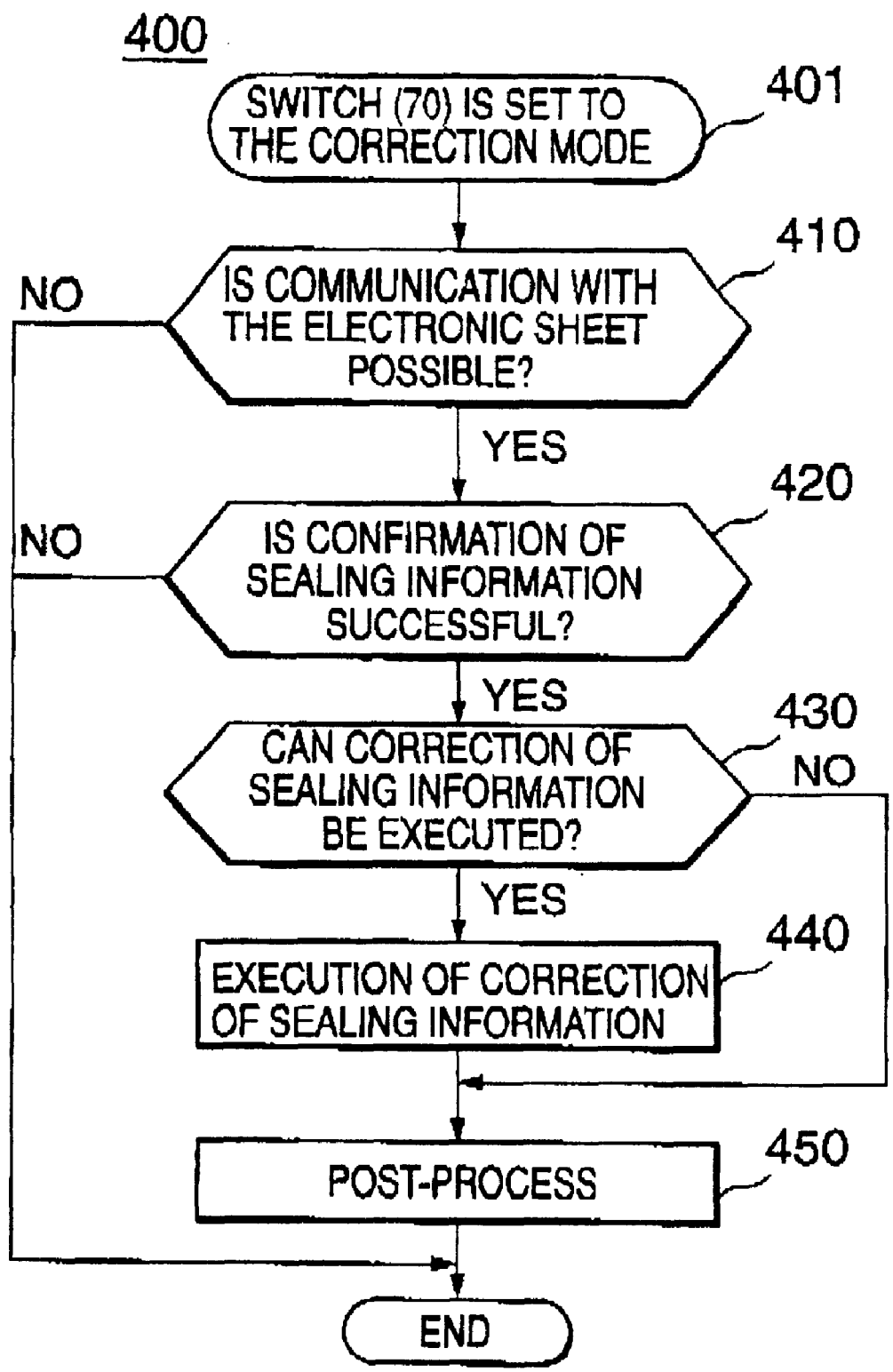
FIG. 11 is a process flowchart of a correction mode for an electronic seal stamp of one embodiment of the present invention.

The correction mode is used when sealing is required again, for example, since the seal image has not been transferred successfully. FIG. 11 shows a process flowchart of electronic sealing to be executed for correction in the correction mode.

When the user turns the switch unit 70 of the electronic seal stamp 10 into the correction mode (401), the information is read from the electronic sheet 100 and a process of confirming possibility of communication is executed (410). When it is confirmed that the communication is possible (410Y), a process for confirming the sealing information is executed (420). When this confirmation is successful (420Y), the next process is executed to confirm the possibility of the electronic sealing that corrects the sealing information (430). When it is found that the electronic sealing for correcting the sealing information is possible (430Y), the process of the electronic sealing for correcting the sealing information is executed (440), and then, a post-process is executed to end the processing (450).

The flow of this processing is simply described as follows. Namely, when the user turns the switch unit 70 of the electronic seal stamp 10 into the correction mode, and impress the electronic seal stamp 10, the electronic seal stamp reads the already-sealed seal stamp identification information from the electronic sheet (IC paper). When the seal stamp identification information in question coincides with the seal stamp identification information within the electronic seal stamp, the seal stamp information 210 and the seal stamp owner information 220 stored in the electronic seal stamp are transferred to the electronic sheet 100.

Figure 12:
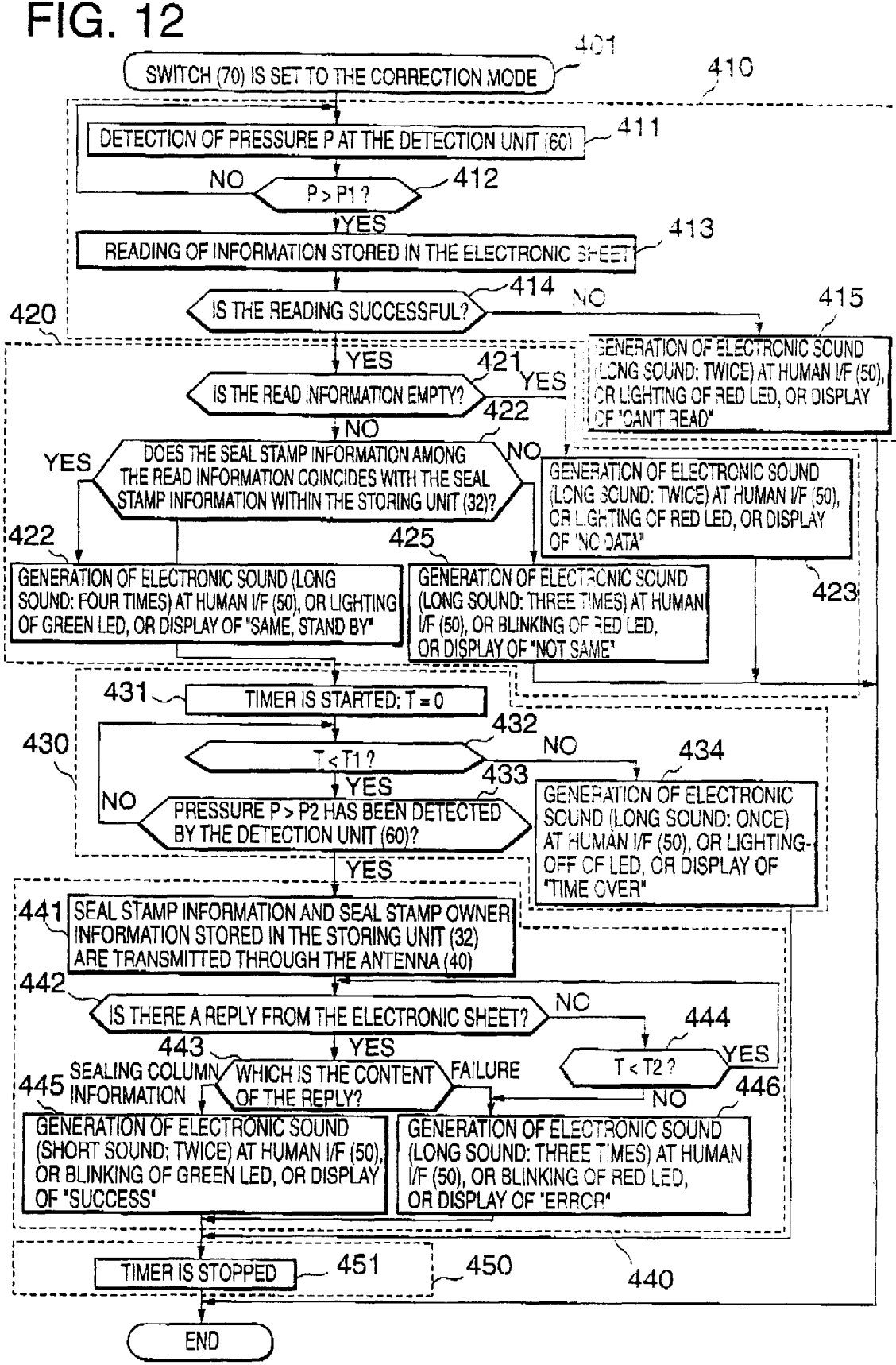
FIG. 12 is a detailed process flowchart of a correction mode for an electronic seal stamp of one embodiment of the present invention.

FIG. 12 is a process flowchart showing an example of the sealing for correction in the correction mode.

In the following, the contents of FIG. 12 will be described. When the user turns the switch unit 70 of the electronic seal stamp 10 into the correction mode (401), the detection unit 60 detects the pressure P (411). And, it is judged if the pressure P is larger than P1 (412). When P is larger than P1 (412Y), the information stored in the electronic sheet 100 is read (413). At that time, if the reading ends in failure (414N), indication to the effect that the reading is failure is given at the human I/F 50 (415), and the processing is ended. For example, a message such as "can't read" is displayed. On the other hand, when the reading is successful (414Y), it is investigated if the seal stamp information 210 is empty among the read information (421). When the information in question is empty (421Y), indication to that effect is given at the human I/F 50 (423), and the processing is ended. For example, a message such as "no data" is displayed. On the other hand, the information in question is not empty (421N), the seal stamp information read in the step 413 is compared with the seal stamp information within the storing unit 32 (422). When they do not coincide (422N), indication to that effect is given at the human I/F 50 (425), and the processing is ended. As the indication, a message "not same" or the like may be displayed, for example. On the other hand, in the case of the coincidence (422Y), indication to that effect is given at the human I/F 50 (424). And, the timer is started (431). Then, in the range of T<T1, the detection unit 60 detects the pressure P and judges if the pressure P is larger than P2 (P>P2) (432 and 433). On this occasion, when T satisfies T>T1 (432N), indication to that effect is given at the human I/F 50 (434), and, after stopping the timer (451), the processing is ended. As the indication, a message "time over" may be displayed, for example. On the other hand, when, in the range of T<T1, the detection unit 60 detects such a pressure P as P>P2 (433Y), the seal stamp information and the seal stamp owner information stored in the storing unit 32 is sent to the electronic sheet 100 through the antenna 40 (441). And, in the range of T<T2, a reply from the electronic sheet 100 is awaited (442 and 444). When there is the reply (442Y) and the content of the reply is sealing column information (443), indication to that effect is given at the human I/F 50 (445), and the timer is stopped (451) to end the processing. As the indication, a message "success" may be displayed, for example. On the other hand, when there is no reply in the range of T<T2 (444N) or when the content of the reply is a failure (443), then, after stopping the timer (451), the processing is ended.

In the present embodiment, the electronic seal stamp 10 sends the seal stamp information and the seal stamp owner information to the electronic sheet 100. However, only the seal stamp information may be sent, without sending the seal stamp owner information.

Thus, the electronic seal stamp 10 has the function of overwriting the seal stamp information 210 and the seal stamp owner information 220 stored in the electronic sheet 100 that has been electronically sealed already. Here, the seal stamp information 210 and the seal stamp owner information 220 stored into the electronic sheet 100 by electronic sealing is referred to as the sealing information 240.

In the correction mode, the user can suitably confirm the status of the operation at the human interface unit (human I/F) 50.

In the meantime, electronic sealing can be performed, not according to the present flow of the processing. For example, at the time of sealing, turning of the switch 70 into the correction mode may cause execution of the process of correcting the sealing information 440.

Further, in the other modes than the correction mode, there may be employed a function of recording new information in addition to already-recorded information, instead of the overwriting function. In a case where information corresponding to a plurality of seal stamps is stored, only one piece of or a part of the stored information may be overwritten. In that case, there may be employed a function that information corresponding to the last sealing is overwritten. Or, information corresponding to the seal image closest to the physically impressed (transferred) seal image may be overwritten.

(1.2.5.3 Check Mode Processing)

Figure 13:
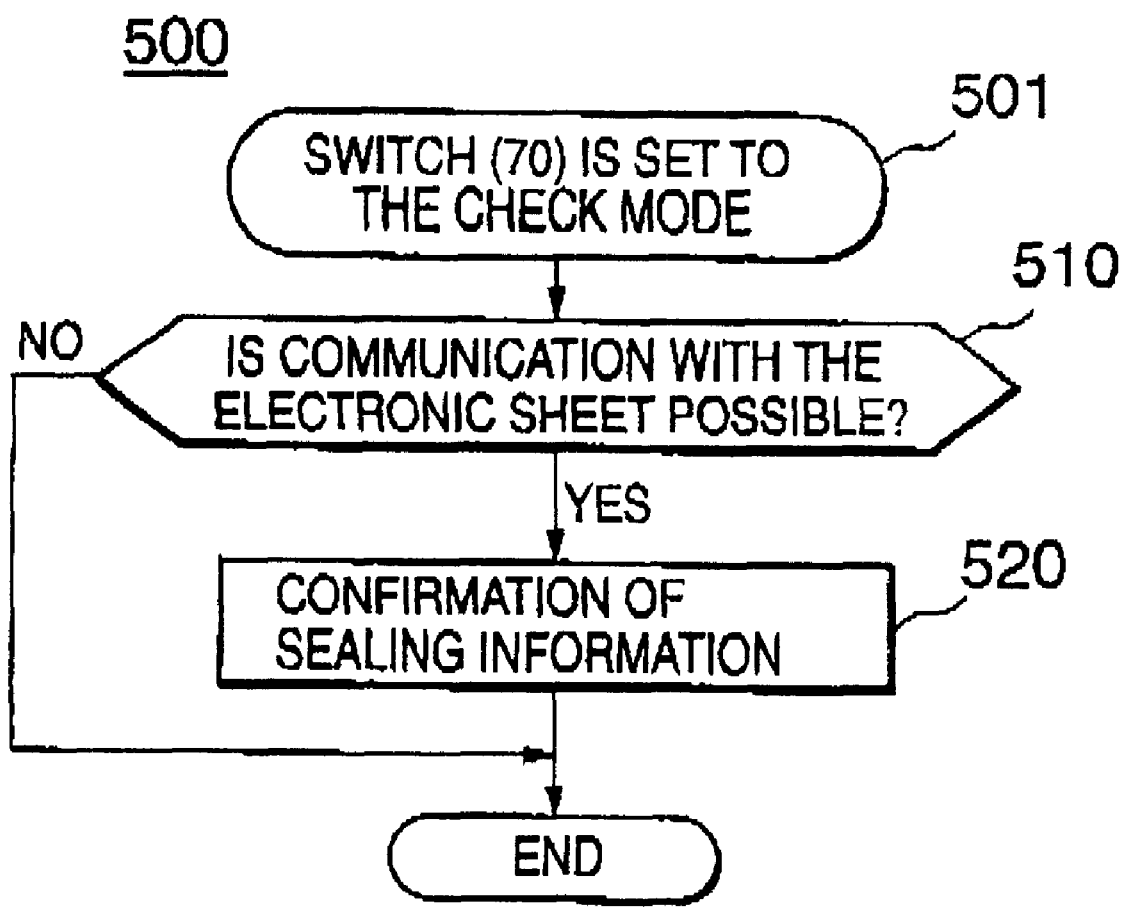
FIG. 13 is a process flowchart of a check mode for an electronic seal stamp of one embodiment of the present invention.

FIG. 13 shows a process flowchart for checking in the check mode.

When the user turns the switch unit 70 of the electronic seal stamp 10 into the check mode (501), the information is read from the electronic sheet 100 and a process of confirming possibility of communication is executed (510). When it is confirmed that the communication is possible (510Y), a process for confirming the sealing information is executed (520) and the processing is ended.

The flow of this processing is more simply described as follows. Namely, when the user turns the switch unit 70 of the electronic seal stamp 10 into the check mode and puts the electronic seal stamp in an impressing state, then the electronic seal stamp reads the already-sealed seal stamp identification information from the electronic sheet (IC paper) 100. And, depending on whether the seal stamp identification information in question coincides with the seal stamp identification information within the electronic seal stamp, it is judged if the electronic seal is given by the same electronic seal stamp.

Figure 14:
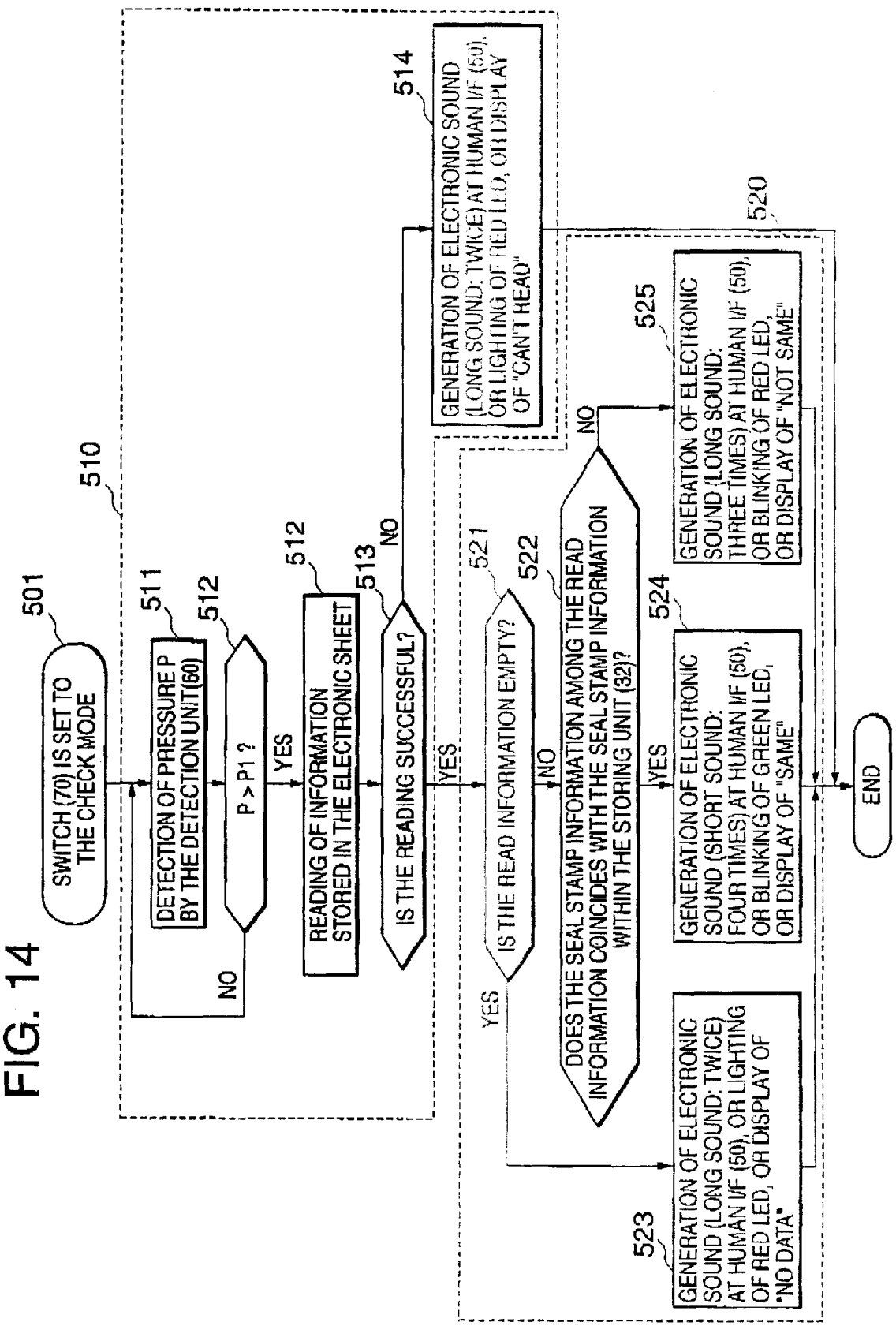
FIG. 14 is a detailed process flowchart of a check mode for an electronic seal stamp of one embodiment of the present invention.

FIG. 14 is a detailed process flowchart of the check process in the check mode.

In the following, the contents of FIG. 14 will be described. Namely, when the user turns the switch unit 70 of the electronic seal stamp 10 into the check mode (501), the detection unit 60 detects the pressure P (511). Then, it is judged if the pressure P is larger than P1 (512). When P is larger than P1 (512Y), the information stored in the electronic sheet 100 is read (513). At that time, if the reading ends in failure, indication to that effect is given at the human I/F 50 (515), and the processing is ended. As the indication, a message "can't read" may be displayed, for example. On the other hand, when the reading is successful (514Y), it is investigated if the seal stamp information is empty among the read information (521). When the information in question is empty (521Y), indication to that effect is given at the human I/F 50 (523), and the processing is ended. As the indication, a message "no data" may be displayed, for example. On the other hand, the information in question is not empty (521N), the seal stamp information read in the step 513 is compared with the seal stamp information within the storing unit 32 (522). When they do not coincide (522N), indication to that effect is given at the human I/F 50 (525) and the processing is ended. As the indication, a message "not same" may be displayed, for example. On the other hand, when they coincides (522Y), indication to that effect is given at the human I/F 50 (524) and the processing is ended. As the indication, a message "same" may be displayed, for example.

The result of the checking may be suitably displayed at the human interface unit (human I/F) 50 so that the user can confirm it.

Thus, the electronic seal stamp has such a function that the user can confirm if the information of the electronic seal stamp, i.e., the sealing information is held on the side of the electronic sheet. By this function, the user can confirm if a seal image on the surface of the paper is genuine or not, when it looks like the seal image printed in ink by the electronic seal stamp.

Further, the human interface unit (human I/F) 50 can be used also after sealing, in order for the user to confirm if electronic sealing has been successful.

The electronic seal stamp may be so constructed that, when it is used in the check mode, it is used being covered, for example, by putting a lid on the stamp surface 20, so that the seal image of the electronic seal stamp should not be transferred.

Accordingly, for fear that the seal stamp should be used without being covered in the check mode, a sensor may be built in for detecting a state that the lid does not exist on the stamp surface. And, such a function may be added that, when the lid does not exist in the check mode, the human I/F 50 gives a warning. Or, the electronic seal stamp may be so constructed that a warning is given to the user when the seal image is likely to be transferred to the electronic sheet. Further, it is possible not to use a lid but to lay another thing (for example, paper) on the electronic sheet, so as to impress the seal stamp on it.

The check process can be executed, not according to the present flow of the processing. For example, at the time of sealing, turning of the switch 70 into the check mode may cause execution of the process of confirming the sealing information 520.

(1.2.6 Sealing Log Information)

The storing unit 32 or a changeable storing unit 34 within the electronic seal stamp stores the frequency of sealing and the information read from the electronic sheet. In the present embodiment, the changeable storing unit 34 is a part of the storing unit 32. However, the changeable storing unit 34 may be physically separated from the storing unit 32. Or, the changeable storing unit 34 may replace the storing unit 32.

Figure 15:
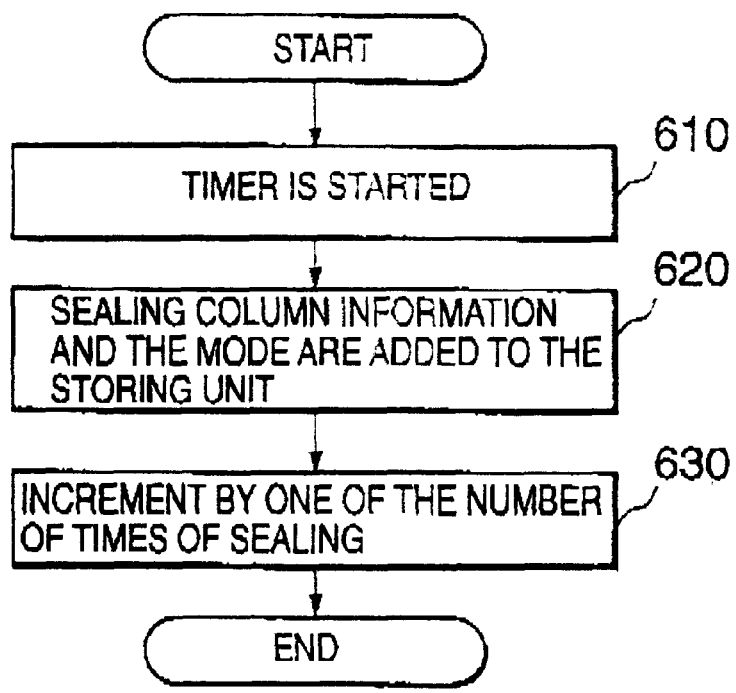
FIG. 15 is a process flowchart for storing a log of an electronic seal stamp of one embodiment of the present invention.

FIG. 15 is a flowchart for executing the process of storing the sealing column information read from the sealed electronic sheet and the frequency of sealing, in the process 350 of the sealing mode processing 300 and in the process 450 of the correction mode processing 400.

Also, the stored information can be displayed at the human interface unit (human I/F) 50, or can be stored separately, by reading from the electronic seal stamp.

However, it may be made impossible to change the contents of the stored information, except for the correction mode. In that case, it is so arranged that the electronic seal stamp can change the stored information in the correction mode, when that electronic seal stamp is same as the electronic seal stamp used for sealing before the correction.

(1.2.7 Shape and Seal Image of the Electronic Seal Stamp)

The electronic seal stamp may be of any shape, such as a cylindrical shape, a quadratic prism, or a card.

Further, on the stamp surface 20, may be carved not only a family name but also a first name, an address, a telephone number, an E-mail address, or other contents of the above-mentioned seal stamp owner information 220. Further, the electronic seal stamp may be a date stamp for recording a date of accepting a book, a document, or the like. In that case, the seal stamp information 210 includes date information on the date of acceptance or of sealing. This date information may be a date that has been set in the seal stamp, or may be decided by the timer within the date stamp.

Figure 16:
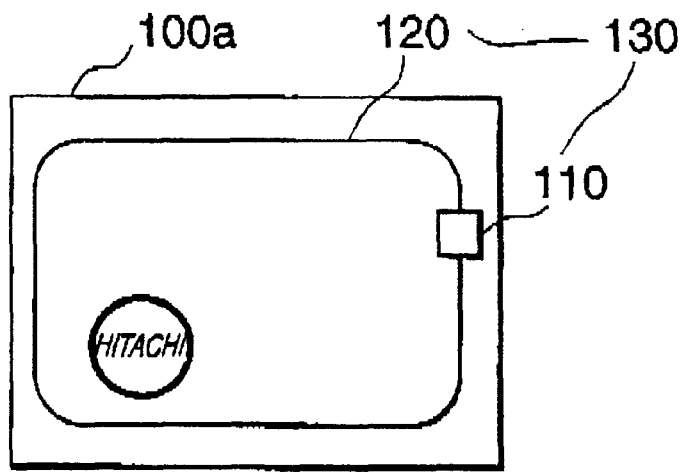
FIG. 16 is a view showing an electronic sheet that can be impressed at the whole sheet according to one embodiment of the present invention.
Figure 17:
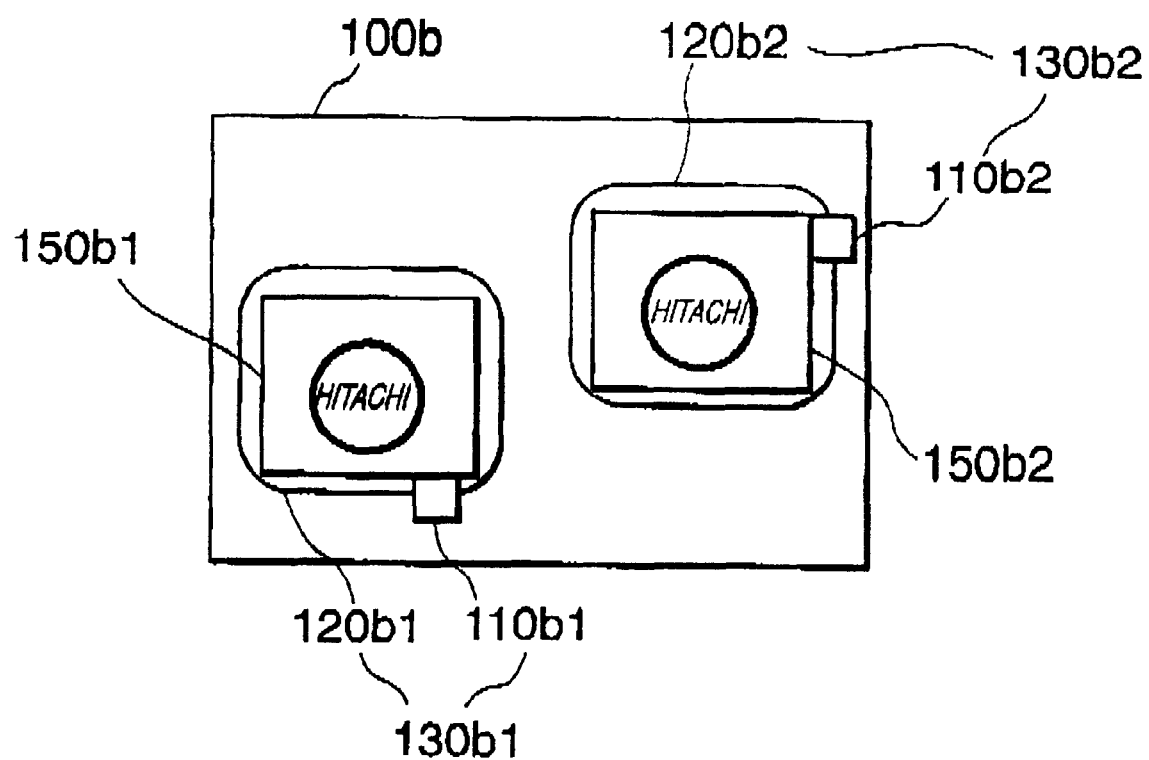
FIG. 17 is a view showing an electronic sheet that can be impressed within a sealing area according to one embodiment of the present invention.

(1.3 Electronic Sheet Adapted for the Electronic Seal Stamp)
(1.3.1 Configuration of the Electronic Sheet)
FIGS. 16 and 17 show examples of configuration of the electronic sheet in the present embodiment.

The electronic sheet 100 comprises at least one circuit unit 130, which comprises the IC chip unit 110 and the antenna unit 120. The IC chip unit 110 stores the information and controls the circuit. The antenna unit 120 is used for communication with the outside.

FIG. 16 shows an electronic sheet 100a in which the antenna unit is extended around to enclose it in the periphery. In that case, any position of the electronic sheet can be impressed.

FIG. 17 shows an electronic sheet 100b in which circuit units 130b1 and 130b2 are arranged in sealing positions 150b1 and 150b2 respectively, and information can be stored in each sealing position.

It is possible to realize an electronic sheet in which configurations of the electronic sheets 10a and 100b are combined. In the present embodiment, a boundary line may be drawn correspondingly to the wiring position of the antenna. Further, the wiring of the antenna may be made visible so that the antenna itself or the antenna that shows through may be used as the boundary line.

(1.3.2 Information Concerning Electronic Sealing Within the Electronic Sheet)

Information inside the electronic sheet and concerning electronic sealing is the sealing column information 251 expressing the place of the sealing and the above-mentioned sealing information 252. As described above, the sealing information 252 comprises the seal stamp information 253 on the seal stamp that is used for the electronic sealing and the seal stamp owner information 254 (FIG. 18).

The sealing column information 251 is the information expressing the place of sealing, and indicates, for example, a name and role of the sealing column. The sealing column information 251 may be stored in the electronic sheet in advance.

The seal stamp information 253 and the seal stamp owner information 254 are of the same contents as, or a part of the contents of the seal stamp information 210 and the seal stamp owner information 220 within the above-described electronic seal stamp, respectively.

In the meantime, the sealing information described here is an example. And, in addition to the seal stamp information and the seal stamp owner information, the sealing information may include status information expressing a status of the sealing information. In that case, a history of the sealing information is stored within the electronic sheet. Further, the unchangeable storing unit 33 will suffice if information stored in it is not changed, and other than IC may be employed.

(2. Variations)
(2.1 Electronic Seal Stamp)
(2.1.1 Processing for Establishing Communication With the Electronic Sheet)

Figure 19:
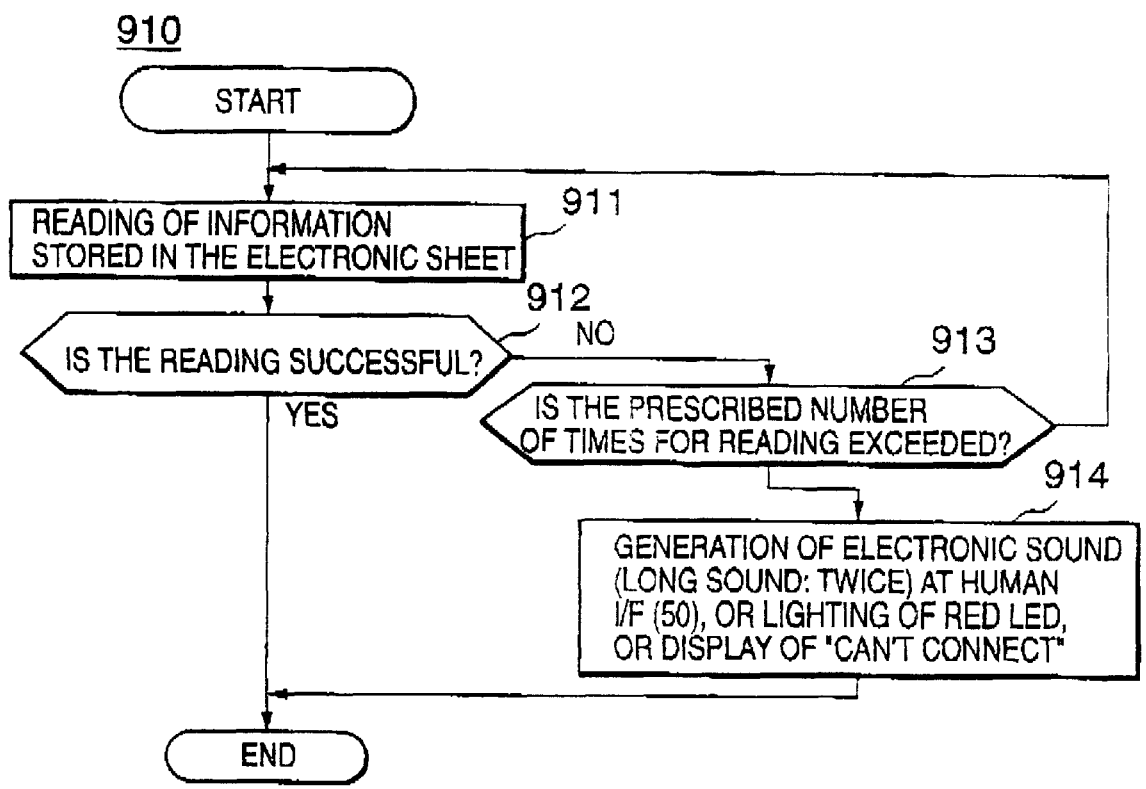
FIG. 19 shows another method of establishing communication with an electronic sheet according to one embodiment of the present invention.

In the process of 310 of the sealing mode processing 300, the process 410 of the correction mode processing 400, and the process 510 of the check mode processing 500, the reading may be tried prescribed number of times as in the process flowchart 910 shown in FIG. 19.

(2.1.2 Calendar Function and Time-indicating Function)
The processing unit 31 may be provided with a calendar function and a time-indicating function. In that case, when electronic sealing is carried out, the date and time of the sealing are transferred to the electronic sheet, together with the seal stamp information and the seal stamp identification information. Then, the date and time of the sealing are stored in the storing unit 32 within the IC unit. Owing to this, more detailed log information can be recorded.

Figure 20:
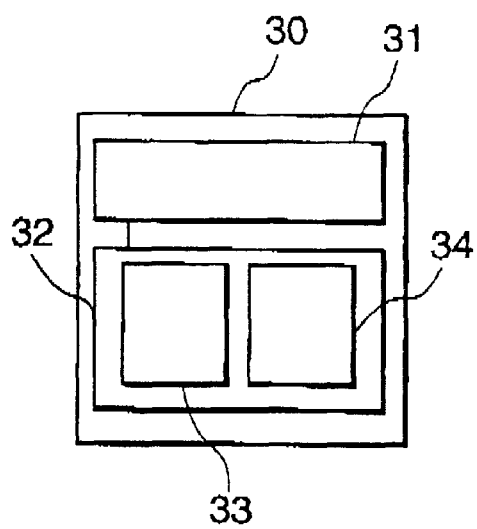
FIG. 20 is a view showing a configuration of an IC unit of one embodiment of the present invention.

(2.1.3 Configuration of the Storing Unit)
As shown in FIG. 20, the storing unit 32 is separated into the unchangeable storing unit 33 and the changeable storing unit 34 comprising a rewritable memory. The seal stamp information 210 is stored in the unchangeable storing unit 33 in order that it can not be changed after the storing. The seal stamp owner information 220 is stored into the changeable storing unit 34.

Figure 21:
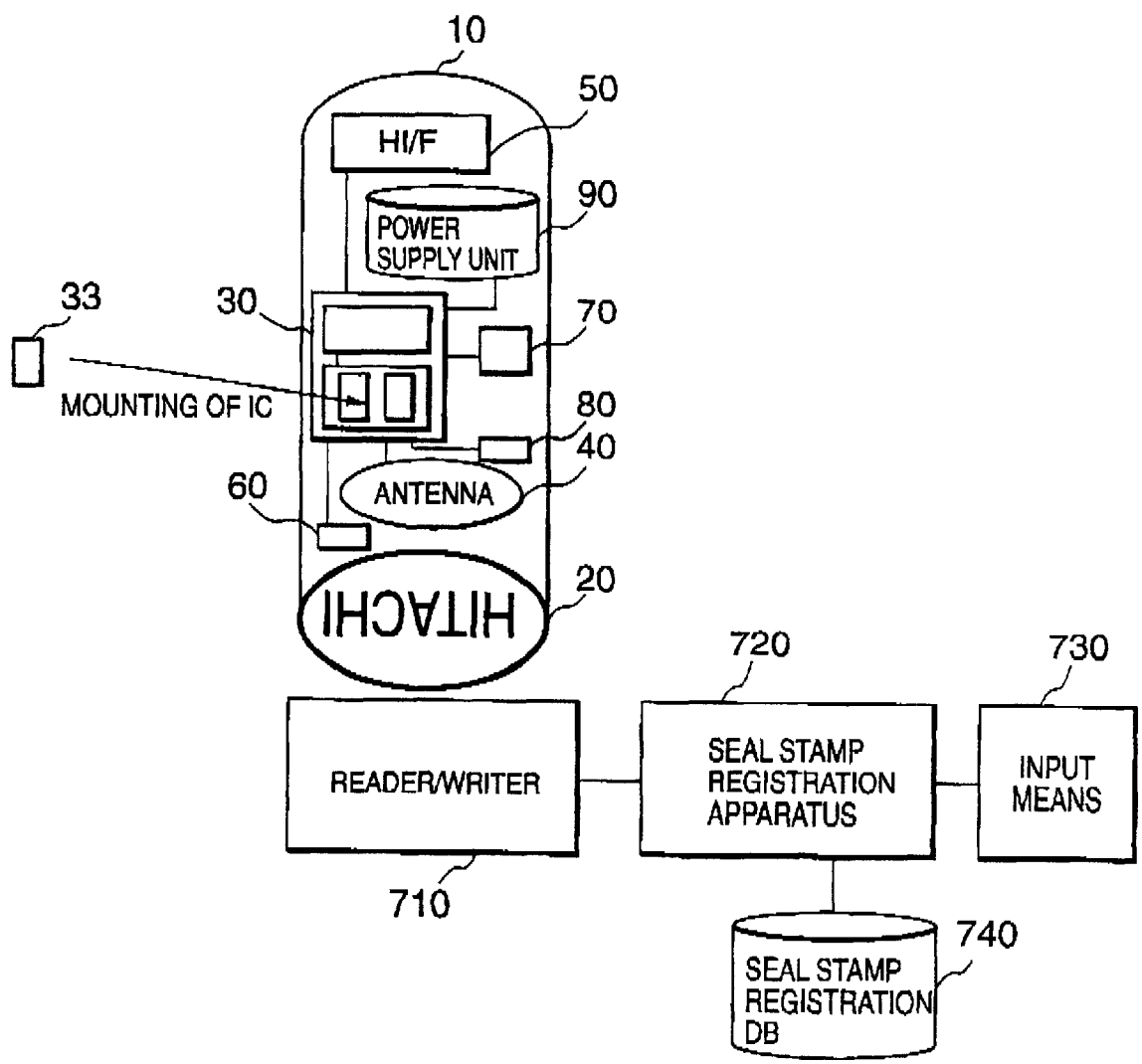
FIG. 21 is a view showing a seal stamp registration system when ROM according to one embodiment of the present invention is mounted.

In that case, as shown in FIG. 21, it is possible to employ a method in which the certificate authority writes the seal stamp identification information and the seal image information into the unchangeable storing unit 33, and it is mounted into the electronic seal stamp.

Figure 22:
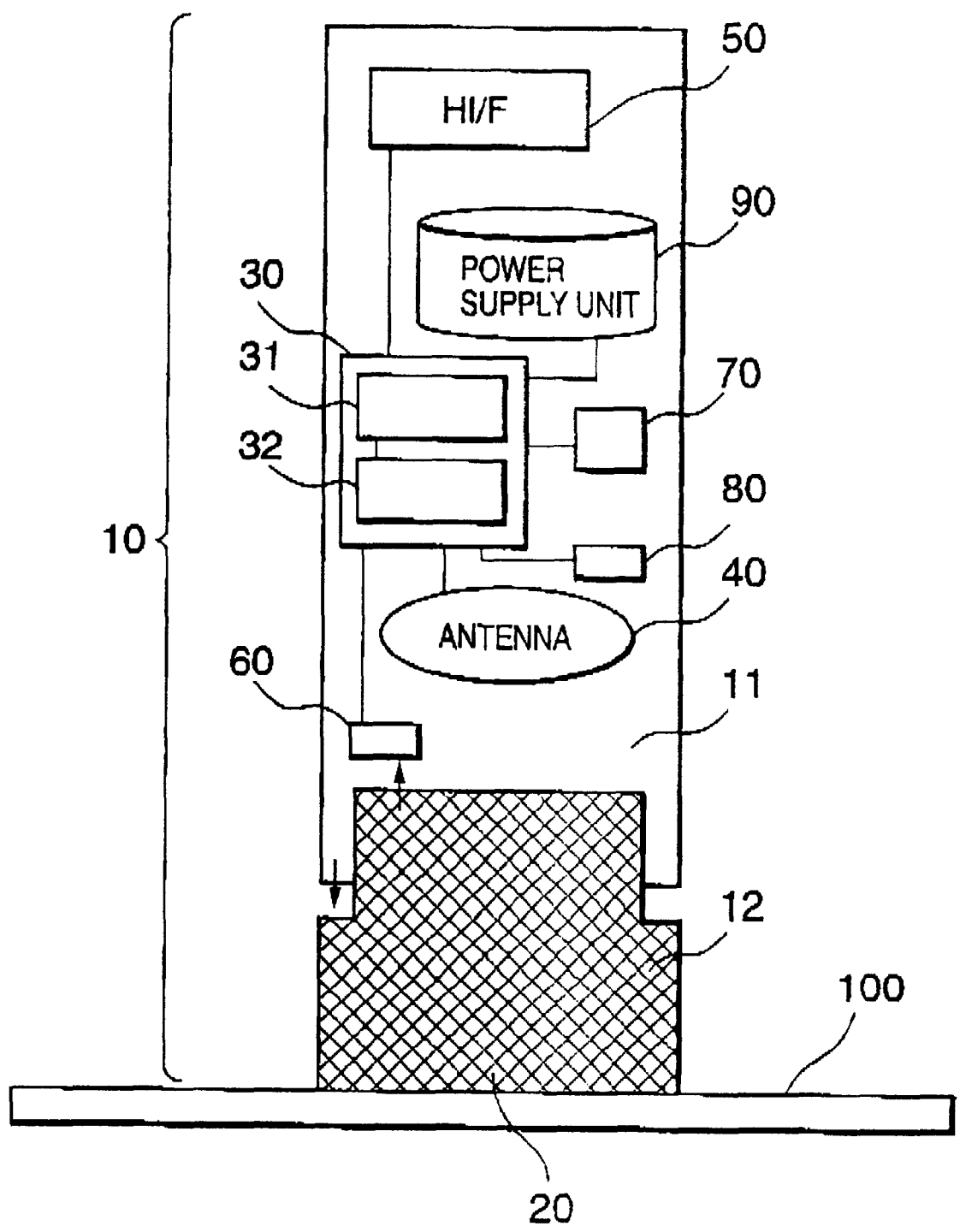
FIG. 22 is a view showing a configuration of an electronic seal stamp using a microswitch in a detection unit according to one embodiment of the present invention.

(2.1.4 Configuration of the Detection Unit)
As the detection unit 60 shown in FIG. 2, a microswitch may be used instead of the above-mentioned pressure sensor. In that case, the electronic seal stamp 10 comprises a main body unit 11 and a movable unit 12 including the stamp surface 20. It is so arranged that, when the electronic seal stamp 10 is impressed on the electronic sheet 100, the movable unit 12 pushes the microswitch in the detection unit 60 (FIG. 22).

Electronic sealing is carried out at a time point when the microswitch of the detection unit 60 is turned ON while the switch 70 is not OFF.

Namely, in the processes 333 and 433, instead of the conditional expression "P>P2", the condition "microswitch =ON" is used. Further, the processes 310 and 410 may be replaced by the above-described process 910.

(3. Security of the electronic seal stamp system utilizing the electronic sheet)
(3.1 Electronic Seal Stamp Verifying System)
FIG. 23 shows a system for verifying the electronic seal stamp.

A sealing place 801 for the electronic seal stamp is provided with a reader 810 for reading information from the electronic seal stamp, a display means 813 for displaying the read information, an antenna 811 connected through a connecting wire 812, and an inquiry terminal 820 for inquiring of the certificate authority 802 through the network 803. The inquiry terminal 820 comprises a display means 821 and an input means 822. The reader 810 and the inquiry terminal are connected through a connecting wire 814. The antenna 811 is laid under the electronic sheet 100, which is a target to be sealed, and the antenna 811 is used as an underlay at the time of sealing. Accordingly, the user of the electronic seal stamp does not have a sense of incongruity.

The information read from the electronic seal stamp at the time of sealing is inquired of the certificate authority 802 through the inquiry terminal 820. The certificate authority collates the information sent through the network, i.e., the seal stamp identification information 211, the seal image information 212, the period of validity 213, the seal stamp owner information 220, etc. stored in the electronic seal stamp, with the information registered in the seal stamp registration DB 740. Thus, the certificate authority investigates if they coincide, to judge the authenticity and validity of the electronic seal stamp. Then, the result of judgement is sent as a reply to the inquiry terminal 820. The sent result is displayed on the display means 821.

Figure 23:
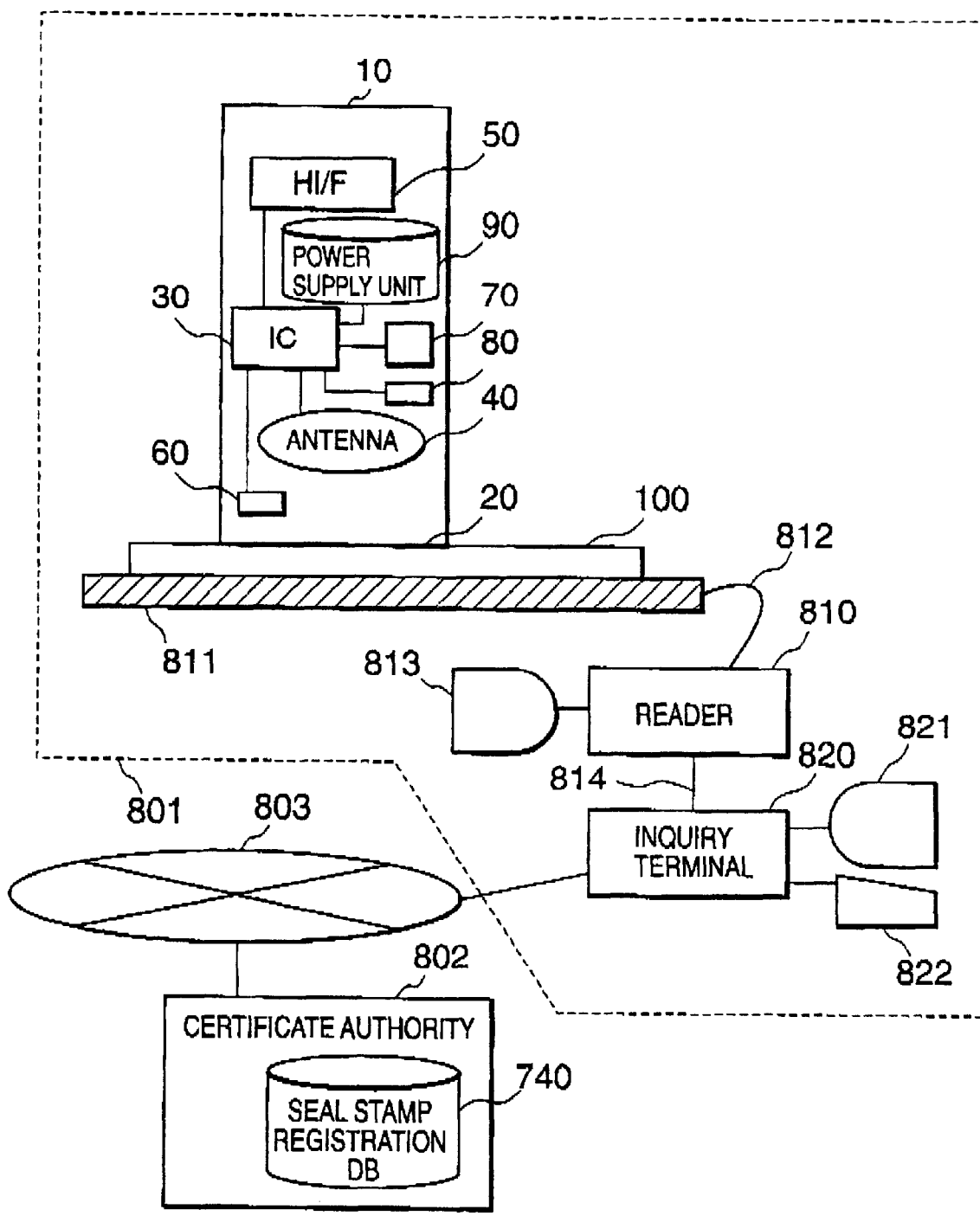
FIG. 23 is a view showing a duplication check system for an electronic seal stamp according to one embodiment of the present invention.

(3.1.1 Validity Judgement on the Electronic Seal Stamp)
The system shown in FIG. 23 is used to judge the validity of the electronic seal stamp. Namely, to judge the validity, the period of validity 213 stored in the electronic seal stamp is read and compared with the present date. For example, that judging function is given to the reader 810. Thus, as far as the validity of the electronic seal stamp is judged from the period of validity 213, it is not necessary to connect the reader 810 and the inquiry terminal 820 through the connecting wire 814 in the system shown in FIG. 23.

Further, without limiting to the time of sealing, the already-sealed electronic sheet 100 may be put on the antenna 811 in order to judge the validity by reading the sealing information stored in the electronic sheet.

(3.1.2 Judgement of the Authenticity and Prevention of Duplication of the Electronic Seal Stamp)

Now, there will be described a method of using the system of FIG. 23 to judge the authenticity of the electronic seal stamp. It is assumed that, among the information transferred by the electronic sealing, the seal stamp information 210 comprises the seal image information 212 and a part of the contents of the seal stamp identification information 211.

For example, when the seal stamp identification information is expressed by an eight-digit number "41421356" as shown in FIG. 4, the above-mentioned part of the seal stamp identification information is assumed to be lower four digits. Namely, here, "1356" is transferred by the electronic sealing, while "4142" is not. Of course, this method of transfer is an example.

Accordingly, when an electronic seal stamp is duplicated using the sealing information stored in the electronic sheet and the seal image remained on the surface of the electronic sheet, a part of the seal stamp identification information, i.e., upper four digits "4142" in the present case, is missing in the duplicated electronic seal stamp. Thus, according to the method described here, it is possible to realize an effective authenticity judgement system against the duplicated electronic seal stamp produced based on the information held within the electronic sheet.

(3.2 Electronic Sealing Monitoring System)

The system shown in FIG. 23 can be also used as a system for monitoring whether the electronic seal stamp illegally reads the information from the electronic sheet. Namely, at the time of sealing, the reader 810 reads through the antenna 811 the information transferred from the electronic seal stamp to the electronic sheet and the information transferred from the electronic sheet to the electronic seal stamp, in addition to the information within the electronic seal stamp. Then, the reader displays the read information on the display means 813, in order to monitor the displayed information.

Here, the illegal reading of the information from the electronic sheet means reading of plural pieces of sealing column information or sealing information at a time. It can be easily judged that there are plural pieces of sealing column information among the information transferred from the electronic sheet to the electronic seal stamp. Accordingly, by providing such a judgement function to the reader 810, automatic judgement is possible, too. Thus, as far as the system of FIG. 23 is used for this object, the reader 810 and the inquiry terminal 820 need not be connected through the connecting wire 814.

(3.3 Encryption of the Information)

In order that the sealing information within the electronic sheet can not be read except the concerned persons to realize thoroughgoing security, encryption using a secret key or public key may be employed. Namely, a secret key of the owner and a public key of the document's recipient produced in the electronic sheet are registered within the electronic seal stamp in advance. The sealing information transferred from the electronic seal stamp to the electronic sheet is encrypted using the secret key of the owner and further encrypted using the public key of the recipient. Thus-encrypted sealing information can not be decrypted without using the secret key of the recipient himself and the public key of the owner, so that surreptitious reading of the information by a third party can be prevented.

Further, the keys registered in advance in the electronic seal stamp may be limited to the public key of the recipient. In that case, the sealing information transferred from the electronic seal stamp to the electronic sheet is encrypted using the public key of the recipient. Thus-encrypted sealing information can not be decrypted without using the secret key of the recipient himself, so that surreptitious reading by a third party can be prevented, similarly to the above example. Of course, an encryption method in which only a secret key is used may be employed. In that case, the owner and the recipient use a common secret key. It is assumed that the secret key and the public key registered in the electronic seal stamp are ones that can be changed at will.

(3.4 Method of Preventing Use by Other Persons Than the User)

(3.4.1 Electronic Seal Stamp With a Password)

Such a function may be provided that a password is stored in the electronic seal stamp in advance, and electronic sealing is possible only when the user of the electronic seal stamp inputs a password and that password coincides with the stored one. The password stored in the electronic seal stamp is encrypted one.

Examples of a method of inputting a password include a method in which a password input means is provided in the human interface unit of the electronic seal stamp, and a method in which a kind of keyhole is provided in the electronic seal stamp, and a key-like object that holds the password electronically is inserted into that keyhole. Such an arrangement can prevent illegal use by another person than the owner of the electronic seal stamp or a legitimate user.

Further, a plurality of passwords may be stored in the electronic seal stamp in advance, so that a plurality of users use different passwords respectively, and, in addition, a password used for the electronic seal stamp may be recorded in each time of electronic sealing. In that case, it is possible to specify the users. For example, in the case of an electronic seal stamp used by a plurality of persons such as a company seal, it is possible to easily specify the persons who used that electronic seal stamp.

By this, it is possible to prevent illegal use even when the electronic seal stamp is used by a plurality of users.

(3.4.2 Electronic Seal Stamp With a Fingerprint Identification Device)

Such a function may be provided that a fingerprint detection device is provided at a grip unit of the electronic seal stamp, a fingerprint of a person who grips the electronic seal stamp is read, and, only when that fingerprint coincides with a fingerprint registered in the electronic seal stamp in advance, electronic sealing is permitted.

(4. Variation of the Electronic Seal Stamp)

(4.1 Ready-made Electronic Seal Stamp)

A ready-made electronic seal stamp affixed with ID is an electronic seal stamp for which, before using, a specific registration corporation or registration organization registers a correspondence between the seal stamp identification information stored in the electronic seal stamp (ready-made electronic seal stamp) in advance and the seal stamp owner information stored later.

For example, such a system may be considered that, at a shop where a ready-made electronic seal stamp affixed with ID is purchased, information of the purchaser of that seal stamp and its seal stamp information are reported to and registered with the registration corporation by telephone or facsimile.

Although the ready-made electronic seal stamp affixed with ID does not have a formally-certifying function, the correction function can be realized by using the seal stamp identification information and the seal stamp owner information, since the seal stamp identification information and the seal stamp owner information are stored at the same time in the electronic sheet.

On the other hand, a ready-made electronic seal stamp without ID is an electronic seal stamp which is used only after the seal stamp owner information is registered within that electronic seal stamp (ready-made electronic seal stamp without ID).

(4.2 Electronic Writing Implement With the Function of the Electronic Seal Stamp)

Instead of the electronic seal stamp, a writing implement such as a ballpoint pen or a fountain pen may be given the function of the electronic seal stamp. This is referred to as an electronic pen. The electronic pen may have a writer for a non-contact IC sheet.

Figure 24:
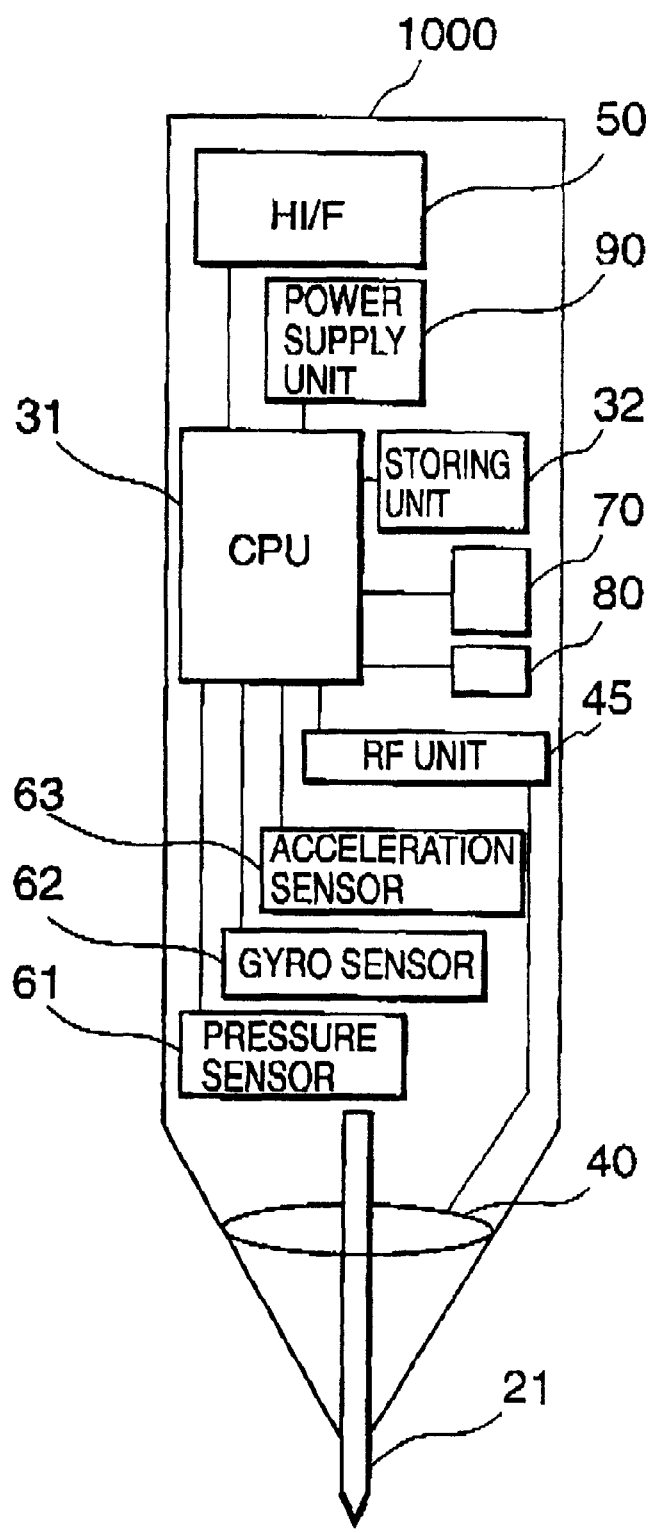
FIG. 24 is a view showing an electronic pen according to one embodiment of the present invention.
Figure 25:
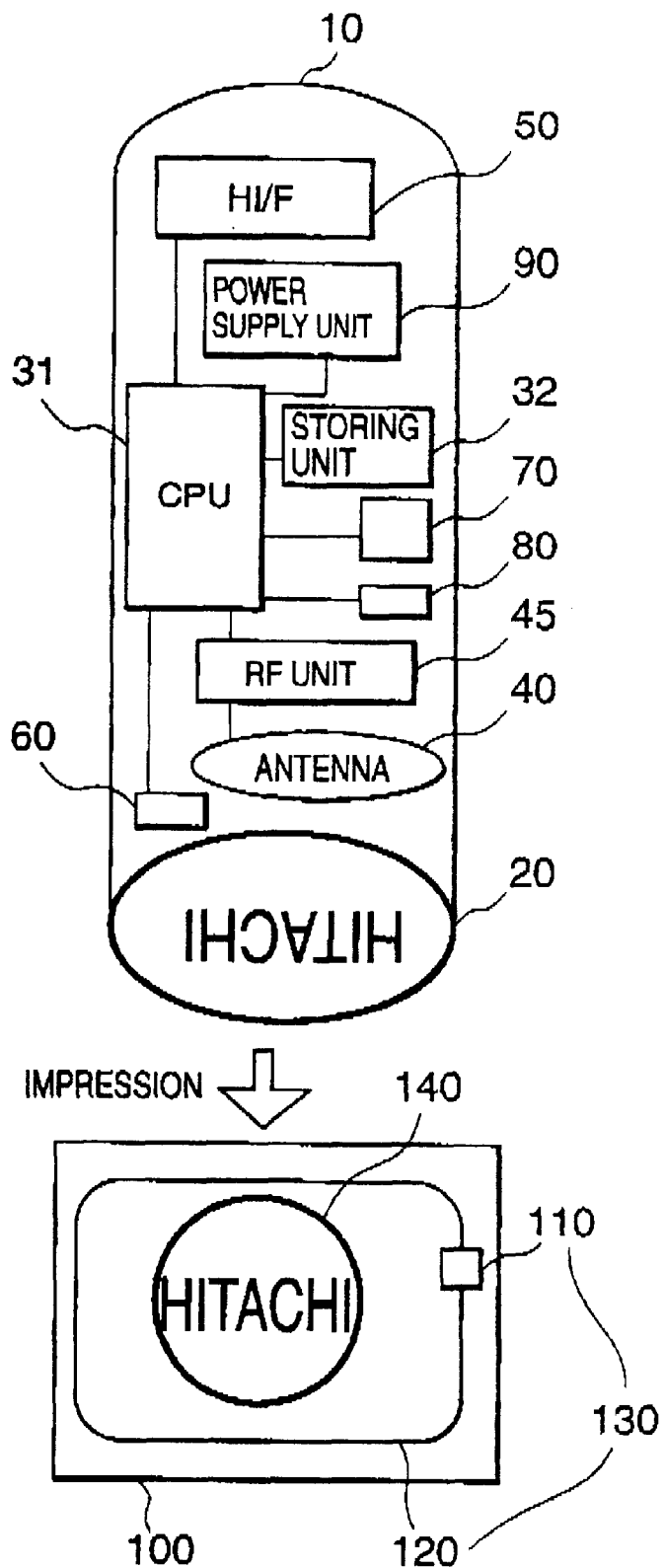
FIG. 25 is a view showing a configuration of a variation of the electronic seal stamp system using the electronic sheet, shown in FIG. 1.
Figure 26:
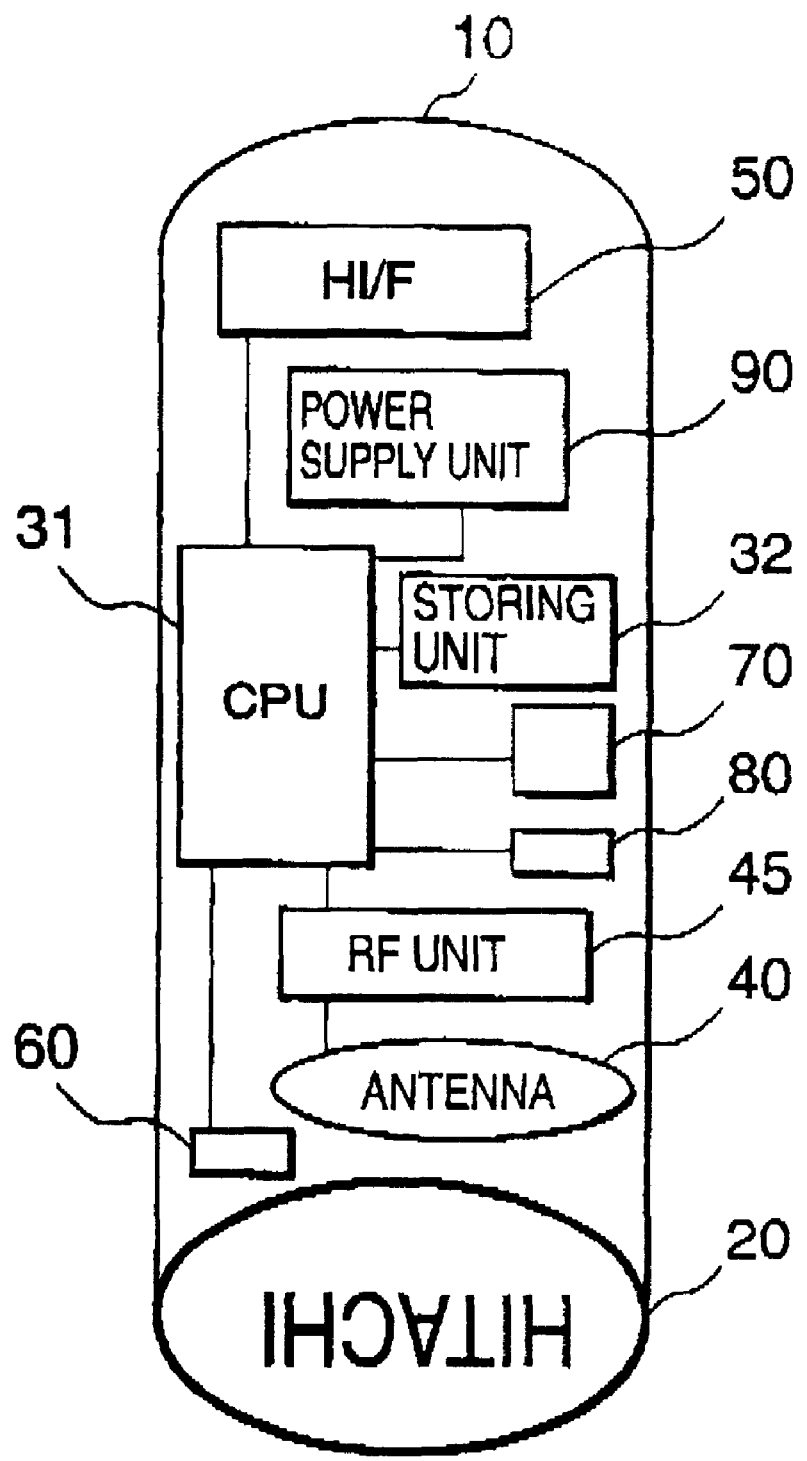
FIG. 26 is a view showing a configuration of a variation of the electronic seal stamp shown in FIG. 2.
Figure 27:
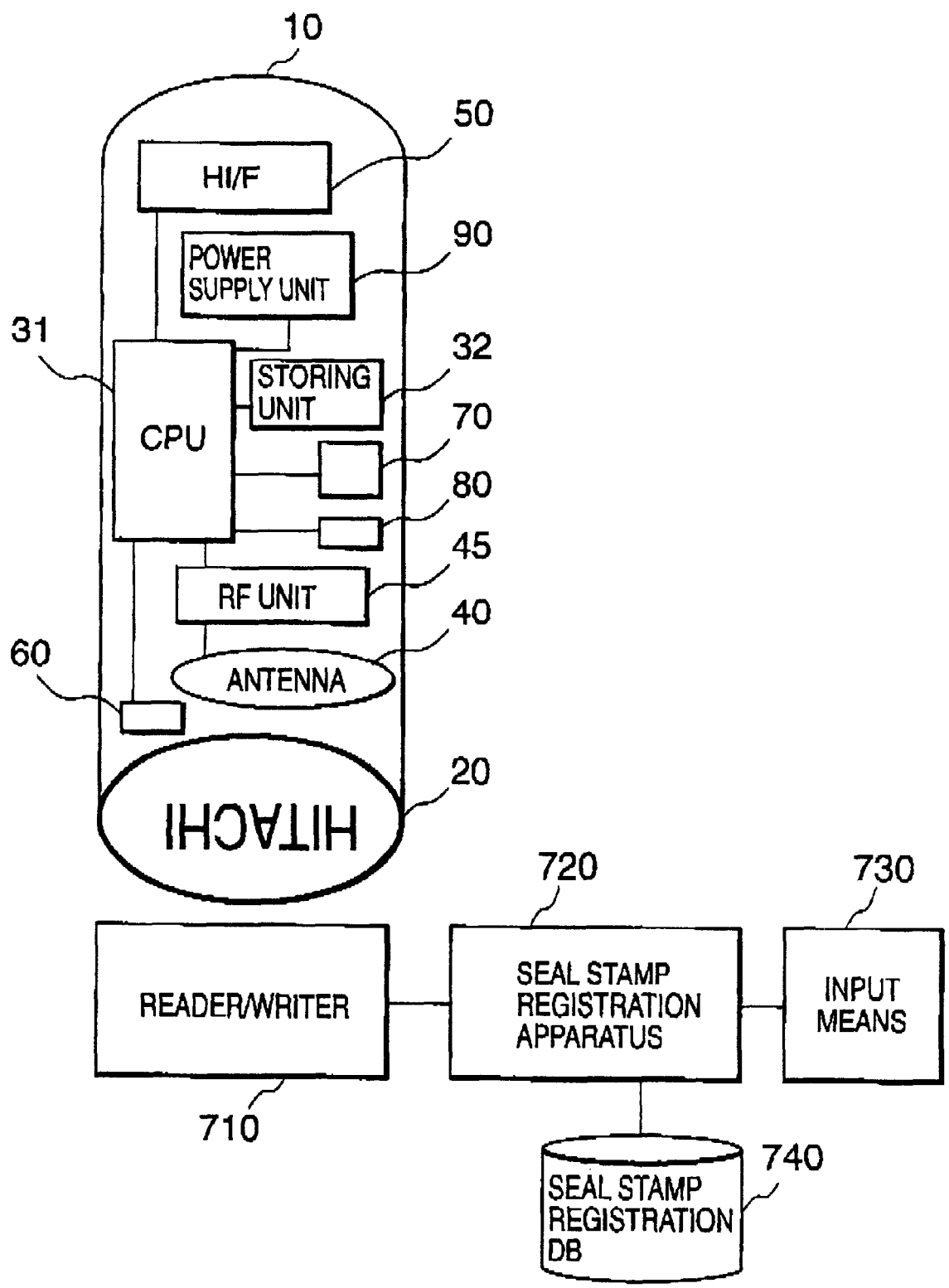
FIG. 27 is a view showing a variation of the seal stamp registration system shown in FIG. 8.
Figure 28:
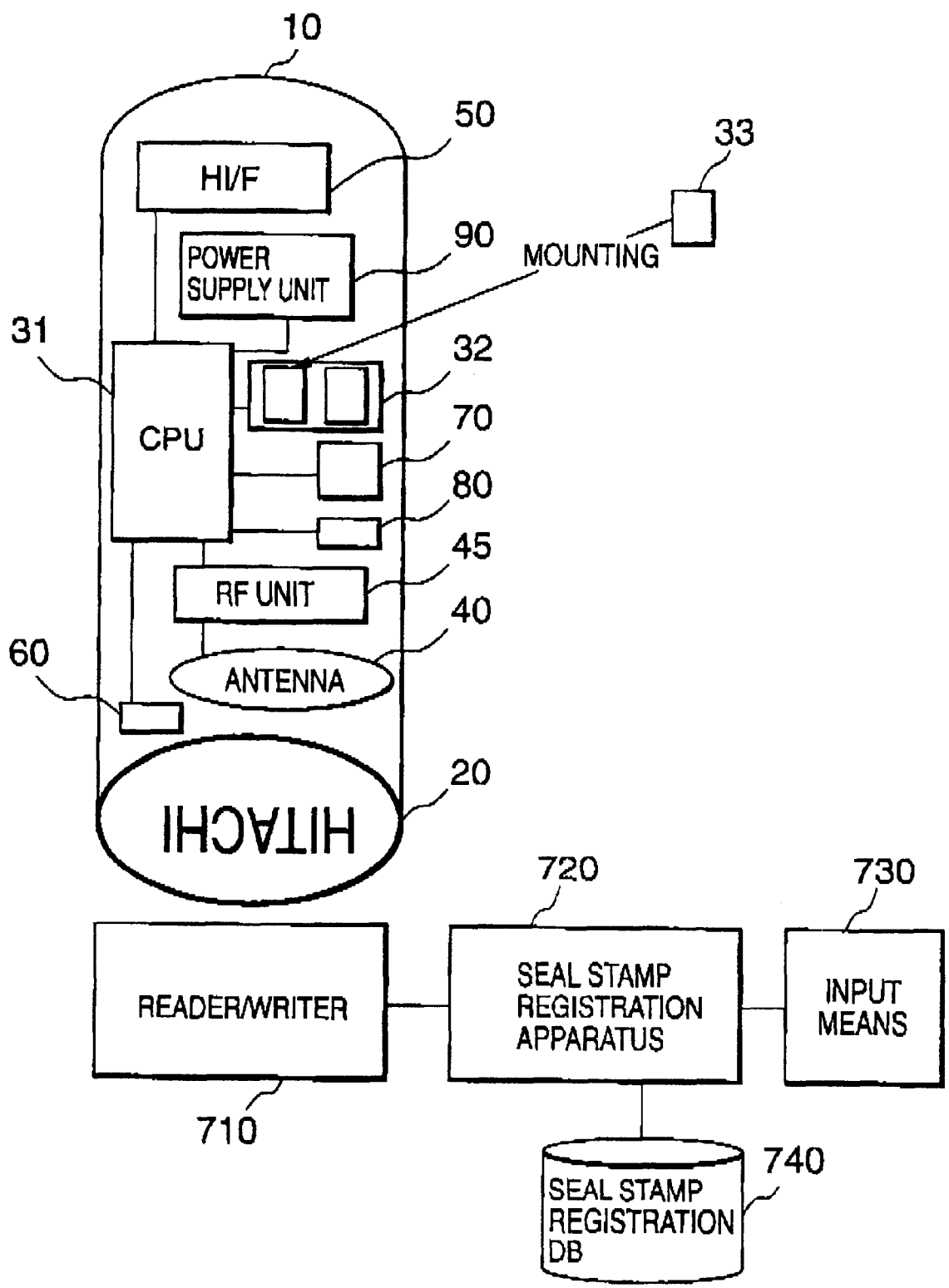
FIG. 28 is a view showing a variation of the seal stamp registration system shown in FIG. 21, in which ROM is mounted.
Figure 29:
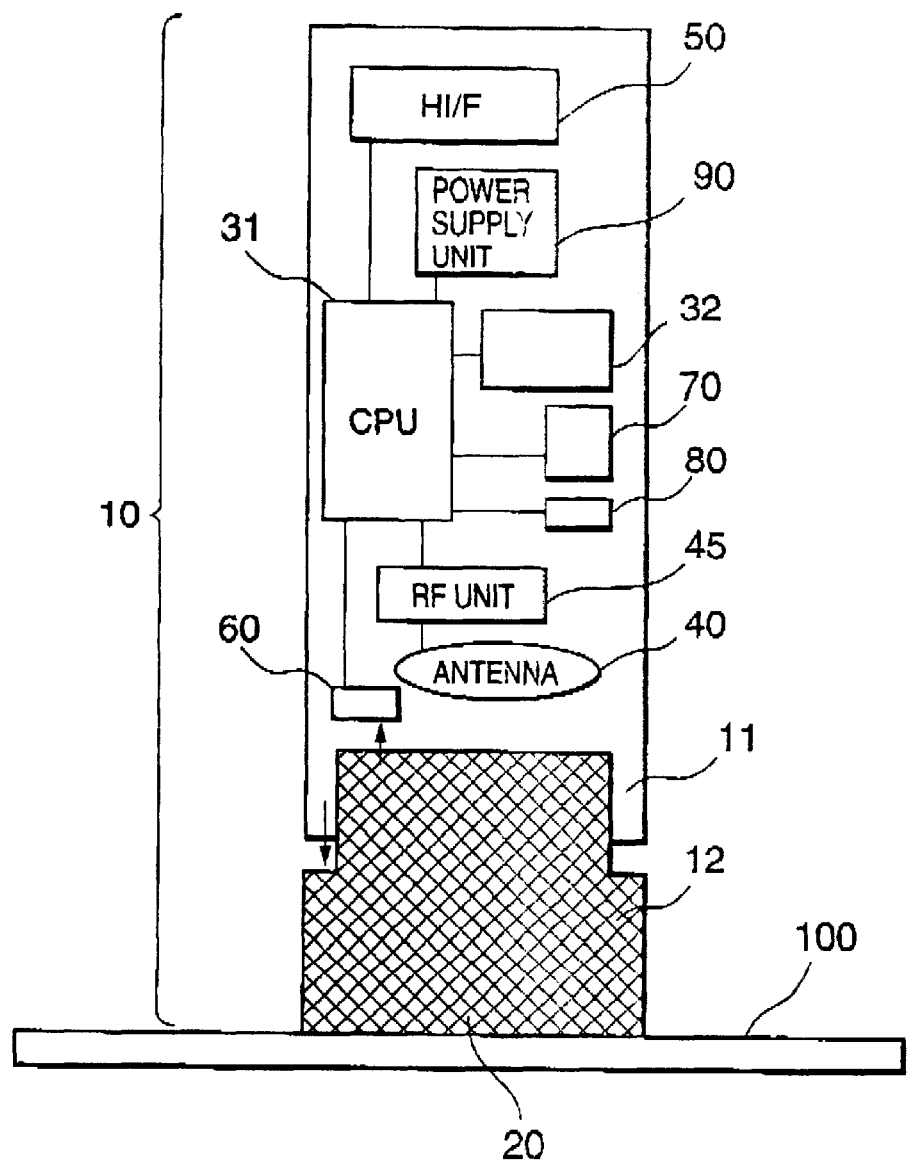
FIG. 29 is a view showing a configuration of a variation of the electronic seal stamp, using the microswitch in the detection unit shown in FIG. 22.

FIG. 24 shows a configuration of the electronic pen.

The electronic pen 1000 has a pen unit 21 that can write characters, symbols and the like according to writing movements of a user, similarly to an ordinary pen. Here, the pen unit 21 has a function similar to a writing implement such as a ballpoint pen, a fountain pen, a pencil, or the like. The electronic pen 1000 comprises, in addition to the pen unit 21, a processing unit 31 for performing circuit control, a storing unit 32 for storing electronic information, an antenna unit 40 for exchanging information with IC within the electronic sheet, an RF unit (Radio Frequency Modulator/Encoder) 45 for modulating data to be sent from the antenna unit 40 and for encoding data received, a human interface unit (human I/F unit) 50 for displaying at least one of a state of the electronic pen 1000 and a state of the electronic sheet, a pressure sensor 61, a gyro-sensor 62, an acceleration sensor 63, a switch unit 70 for selecting a mode of the electronic pen, a reset switch unit 80 for resetting the circuit of the processing unit 31, and a power supply unit 90 for supplying power to the electronic pen.

In the present embodiment, electronic information (data) is sent to the electronic sheet. However, similarly to the above-described electronic seal stamp, electronic information may be sent to others, in addition to a medium onto which writing is performed.

Among the above-mentioned components of the electronic pen 1000, it is not always required that the pressure sensor 61, the gyro-sensor 62, and the acceleration sensor 63 are used combinedly. Further, a speed sensor may be provided for detecting a speed at which the pen moves. The pressure sensor 61 detects a pressure (writing pressure) put on the pen unit 21. In addition to the writing pressure, a pressure that the fingers put on the electronic pen when a user grips the pen may be detected. Or, instead of the writing pressure, the pressure put on the electronic pen may be detected. The gyro-sensor 62 detects a posture of the electronic pen, and the acceleration sensor 63 detects accelerations of the electronic pen in the x-, y-, and z-directions. In the case of the electronic pen, a counterpart of the seal image of the electronic seal stamp is a signature or handwriting, for example. Referring it as signature information, the signature information is used being stored in the storing unit of the electronic writing implement. As the signature information, handwriting of a signature is stored as image data. Further, acceleration and writing pressure at use by the true user may be stored. As the information transferred to the electronic sheet, in addition to the above-described signature information, there may be used data obtained by using the acceleration sensor and the pressure sensor to detect real-time acceleration and writing pressure from the handwriting while a signature is given by the ballpoint pen function of the electronic pen.

Thus, also when a writing implement is used to sign, electronic signature can be carried out similarly to the case of the above-described electronic seal stamp.

Further, the above-described electronic seal stamp and electronic writing implement can be combined.

(5. Variation of the Electronic Sheet)

As the electronic seal stamps include the registered electronic seal stamp, the ready-made electronic seal stamp affixed with ID, and the ready-made electronic seal stamp without ID, the electronic sheets may be classified.

For example, an ID-adapted electronic sheet that does not receive electronic sealing except for an electronic seal stamp affixed with ID, and a non-ID-adapted electronic sheet that receives electronic sealing without depending on existence of ID may be mentioned.

(6. Summary)

The above description is based on the embodiments, and does not limit the invention in any way. The electronic seal stamp has the stamp surface similarly to the conventional seal stamp, and accordingly, it can be used also together with the conventional seal stamp system (using a seal stamp and ordinary paper).

By reading the sealing information together with the document information from an electronically-sealed electronic sheet, it is consequently possible to seal electronic information. Thus, electronization of information is realized. In this way, in a transition period to full electronization, this system can be introduced without giving a sense of incongruity. From the viewpoint of users, the equipment installation cost is low and it is not necessary to acquire difficult operations of apparatuses such as a computer etc. Thus, the electronic seal stamp system easy to accept is realized. Moreover, by adopting the authentication system in which authentication is carried out for each electronic seal stamp, strong security is realized.

Further, the present invention not only inherits the seal stamp culture but also can be introduced into nations of the signature culture, by employing the electronic implements having the electronic seal stamp function.

In the above embodiments, the description has been given about sealing and writing on paper (document). However, the present invention can be also applied to, for example, printing or stamping of a use-by date, a bar code, or the like. Namely, such an arrangement may be employed that the above-mentioned information is printed or stamped on a package of a commodity, an object attached to a commodity, or a commodity itself, and, at the same time, electronic information of the use-by date, the bar code, or the like is recorded in the package, the commodity itself, or the like. Further, the electronic information may be stored into a database of a maker, a certificate authority, a government office that supervises the commodity in question, a consumer organization, a shop, or the like.

Figure 30:
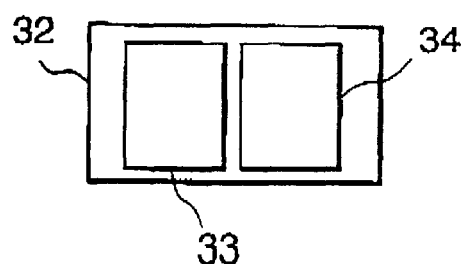
FIG. 30 is a view showing a configuration of a variation of the IC unit shown in FIG. 20.

Further, as the configuration of the electronic seal stamp 10, one shown in FIG. 25, 26, 27, 28, 29 or 33 may be employed. Namely, instead of the IC unit 30, CPU (processing unit) 31, which performs circuit control, and the storing unit 32 may be included. Further, an RF unit 45 may be provided for modulating data to be sent through the antenna 40 and for encoding data received. In that case, as the configuration of the storing unit 32, one shown in FIG. 30 is employed.

According to the present invention, it is possible at lower costs to realize the electronic seal stamp system in which an impressed seal image can be confirmed similarly to the conventional seal stamp, and, at the same time, electronic sealing can be performed.

What is claimed is:

1. A method of electronic writing in which writing on a medium is performed by using a writing means capable of writing characters or symbols on said medium, wherein, in accordance with a user of said writing means making a writing movement on said medium, the following steps are carried out, said steps comprising:

writing characters or symbols, which correspond to said writing movement, on said medium, the characters or symbols producing an imprint on said medium;

sending electronic certification information that identifies said writing means, from said writing means, in accordance with said writing step; and storing said electronic certification information into a storing means, contained in an Integrated Circuit (IC) embedded in said medium, associating said electronic certification information with said medium.

2. The method of electronic writing according to claim 1, wherein:

said writing means is a seal stamp having a stamp surface; and said writing step is a step of transferring a seal image of said stamp surface to said medium.

3. The method of electronic writing according to claim 2, wherein:

said seal stamp has an effect of giving approval to contents held in said medium.

4. The method of electronic writing according to claim 2, wherein:

said seal stamp is a stamp that transfers a date as said seal image.

5. The method of electronic writing according to claim 1, wherein:

said writing means is a pen that writes characters or symbols on said medium according to the writing movement of the user.

6. The method of electronic writing according to claim 1, wherein:

said medium has said storing means.

7. The method of electronic writing according to claim 1, wherein:

said sending step further sends money data from said writing means to said storing means, said money data relating to a money payment; and said storing step stores said money data.

8. The method of electronic writing according to claim 7, wherein:

said money data is value data having a monetary value.

9. An electronic writing implement that outputs electronic information, comprising:

a writing means that writes characters or symbols on a medium, said characters or symbols corresponding to a writing movement of a user of said electronic writing implement on said medium, the characters or symbols producing an imprint on said medium; and a sending means for ending electronic certification information that identifies said electronic writing means, in accordance with said writing by said writing means;

wherein said medium stores said electronic certification information into a storing means, contained in an Integrated Circuit (IC) embedded in said medium, associating said electronic certification information with said medium.

10. The electronic writing implement according to claim 9, wherein:

said writing means is a stamp surface whose seal image is transferred to said medium; and said electronic writing implement is a seal stamp having said stamp surface.

11. The electronic writing implement according to claim 10, wherein:

said seal stamp has an effect of giving approval to contents held in said medium.

12. The electronic writing implement according to claim 10, wherein:

said seal stamp is a stamp that transfers a date as said seal image.

13. The electronic writing implement according to claim 9, wherein:

said electronic writing implement is a pen that writes characters or symbols on said medium in accordance with the writing movement of the user.

14. The electronic writing implement according to claim 9, wherein:

said sending means sends said electronic information to a storage device possessed by said medium.

15. The electronic writing implement according to claim 14, wherein:

said sending means further sends money data to said storage device, said money data relating to a money payment.

16. The electronic writing implement according to claim 15, wherein:

said money data is value data having a monetary value.

17. The electronic writing implement according to claim 15, wherein:

said sending means is an antenna that sends the electronic information to said storage device by wireless.

18. A method of giving approval to information held in a medium, by using a seal stamp that can transfer a seal image of a stamp surface to said medium, wherein, according as a user of said seal stamp makes a sealing movement on said medium, the following steps are carried out, said steps comprising:

transferring said seal image to said medium, the seal image producing an imprint on said medium;

sending electronic certification information that identifies said seal stamp to a storing means, contained in an Integrated Circuit (IC) embedded in said medium, associating said electronic certification information with said medium; and storing the sent electronic certification information into said storing means;

wherein authenticity of the approval of the information held in said medium can be confirmed using the stored electronic certification information and the transferred seal image.

19. The method according to claim 18, wherein:

said medium has said storing means.

20. The method according to claim 19, further comprising a step of:

making money information be usable as money in accordance with the user of said seal stamp making the sealing movement on said medium, said money information being information that has been stored in said storing means in advance and has a value as money.

21. The method according to claim 18, wherein:
said sending step further sends a period of validity for said seal stamp to give approval.

22. An electronic writing implement that outputs electronic information, comprising:
a pen unit, the pen unit being provided at a tip of said electronic writing implement and writes characters or symbols on a medium, said characters or symbols corresponding to a writing movement of a user of said electronic writing implement on said medium, the characters or symbols producing an imprint on said medium;
memory, the memory being contained in an Integrated Circuit (IC) embedded in said medium and storing electronic certification information for identifying said electronic writing implement; and
a transmitter, the transmitter electrically connected with said memory, the transmitter sending said electronic certification information in accordance with the writing by said pen unit.

23. The electronic writing implement according to claim 22, wherein:
said pen unit is a stamp surface for transferring a seal image to said medium; and
said electronic writing implement is a seal stamp having said stamp surface.

24. The electronic writing implement according to claim 23, wherein:
said seal stamp has an effect of giving approval to contents held in said medium.

25. The electronic writing implement according to claim 23, wherein:
said seal stamp is a stamp that transfers a date as said seal image.

26. The electronic writing implement according to claim 22, wherein:
said electronic writing implement is a pen that writes characters or symbols on said medium in accordance with the writing movement of the user.

27. The electronic writing implement according to claim 22, wherein:
said transmitter sends said electronic information to a storage device possessed by said medium.

28. The electronic writing implement according to claim 22, wherein:
said transmitter further sends money data to said storage device, said money data relating to a money payment.

29. The electronic writing implement according to claim 28, wherein:
said money data is value data having a monetary value.

30. The electronic writing implement according to claim 28, wherein:
said transmitter includes an antenna that sends the electronic information to said storage device by wireless.

31. A certification system comprising:
an electronic seal, the electronic seal capable of writing characters or symbols;
an electronic sheet, the electronic sheet allowing the writing of characters or symbols onto it by the electronic seal, said characters or symbols corresponding to a writing movement of a user of the electronic seal on the electronic sheet, the characters or symbols producing an imprint on the electronic sheet, the electronic sheet containing an embedded Integrated Circuit (IC) with memory, the memory storing electronic certification information identifying said electronic seal and associating said electronic certification information with said electronic sheet; and
a transmitter, the transmitter electrically connected with said memory and sending the electronic certification information to said memory in accordance with said writing.

32. The system according to claim 31, wherein said electronic seal has an effect of giving approval to contents held in said electronic sheet.

33. The system according to claim 31, wherein said electronic seal is a seal that transfers a date as an electronic seal image.

34. The system according to claim 31, wherein the sending further sends money data from said electronic seal to said memory, said money data relating to a money payment, said memory storing said money data.

35. The system according to claim 34, wherein said money data is value data having a monetary value.

36. The system according to claim 31, wherein said electronic seal contains a surface with a seal image, the seal image being transferable to said electronic sheet by said writing movement.

37. The system according to claim 31, wherein said transmitter includes an antenna that sends the electronic certification information to said storage device by wireless transmission.

38. The system according to claim 31, wherein said sending further sends a period of validity for said electronic seal to give approval.

39. A certification method comprising:
writing characters or symbols by an electronic seal onto an electronic sheet, the characters or symbols producing an imprint on the electronic sheet;
storing electronic certification information identifying said electronic seal and associating said electronic certification information with said electronic sheet in a memory, the electronic sheet containing an embedded Integrated Circuit (IC) containing the memory; and
sending the electronic certification information to said memory in accordance with said writing.

40. The method according to claim 39, wherein said electronic seal has an effect of giving approval to contents held in said electronic sheet.

41. The method according to claim 39, wherein said electronic seal transfers a date as an electronic seal image.

42. The method according to claim 39, wherein the sending further sends money data from said electronic seal to said memory, said money data relating to a money payment, said memory storing said money data.

43. The method according to claim 42, wherein said money data is value data having a monetary value.

44. The method according to claim 39, wherein said electronic seal contains a surface with a seal image, the seal image being transferable to said electronic sheet by said writing movement.

45. The method according to claim 39, further comprising sending the electronic certification information to said storage device by wireless transmission.

46. The method according to claim 39, further comprising sending a period of validity for said electronic seal to give approval.

* * * * *